US011435629B2

(12) United States Patent
Sato et al.

(10) Patent No.: US 11,435,629 B2
(45) Date of Patent: Sep. 6, 2022

(54) OPTICAL ELEMENT, LIGHT GUIDE ELEMENT, AND IMAGE DISPLAY DEVICE

(71) Applicant: FUJIFILM Corporation, Tokyo (JP)

(72) Inventors: Hiroshi Sato, Minami-ashigara (JP); Yukito Saitoh, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 16/913,897

(22) Filed: Jun. 26, 2020

(65) Prior Publication Data

US 2020/0326579 A1 Oct. 15, 2020

Related U.S. Application Data

(63) Continuation of application No. PCT/JP2018/048366, filed on Dec. 27, 2018.

(30) Foreign Application Priority Data

Dec. 27, 2017 (JP) .............................. JP2017-250971
Oct. 12, 2018 (JP) .............................. JP2018-193324
Dec. 11, 2018 (JP) .............................. JP2018-231747

(51) Int. Cl.
*G02F 1/1347* (2006.01)
(52) U.S. Cl.
CPC ................................. *G02F 1/13473* (2013.01)
(58) Field of Classification Search
None
See application file for complete search history.

(56) References Cited

U.S. PATENT DOCUMENTS 6,061,108 A    5/2000 Anderson et al.
2001/0033351 A1  10/2001 Takami et al.
(Continued)

FOREIGN PATENT DOCUMENTS

CN        1314604 A      9/2001
CN      107615119 A  *   1/2018   ........... G02F 1/1335
(Continued)

OTHER PUBLICATIONS

Japanese Office Action for corresponding Japanese Application No. 2019-562484, dated Jun. 29, 2021, with English translation.
(Continued)

*Primary Examiner* — James A Dudek
(74) *Attorney, Agent, or Firm* — Birch, Stewart, Kolasch & Birch, LLP

(57) ABSTRACT

An object is to provide an optical element in which a wavelength dependence of reflection is small, a light guide element including the optical element, and an image display device including the light guide element. The optical element includes a plurality of cholesteric liquid crystal layers having different selective reflection center wavelengths, in which the cholesteric liquid crystal layer has a liquid crystal alignment pattern in which a direction of an optical axis derived from a liquid crystal compound changes while continuously rotating in at least one in-plane direction, and in a case where a length over which the optical axis rotates by 180° in the in-plane direction is set as a single period, a permutation of lengths of selective reflection center wavelengths and a permutation of lengths of the single periods match each other in the cholesteric liquid crystal layers.

17 Claims, 8 Drawing Sheets

(56) References Cited

U.S. PATENT DOCUMENTS

| | | |
|---|---|---|
| 2009/0273742 A1 | 11/2009 | Kuo et al. |
| 2012/0249929 A1 | 10/2012 | Fukuda et al. |
| 2016/0231568 A1 | 8/2016 | Saarikko et al. |
| 2018/0164480 A1 | 6/2018 | Yoshida |
| 2019/0086786 A1 | 3/2019 | Katoh et al. |
| 2020/0409202 A1 | 12/2020 | Kodama et al. |

FOREIGN PATENT DOCUMENTS

| | | | | |
|---|---|---|---|---|
| CN | 107250889 B | * | 1/2020 | ........... G02B 5/1866 |
| CN | 111902749 A | | 11/2020 | |
| GB | 2 455 127 A | | 6/2009 | |
| JP | 10-206638 A | | 8/1998 | |
| JP | 2011-247934 A | | 12/2011 | |
| JP | 2012-181360 A | | 9/2012 | |
| JP | WO2017/199812 A1 | | 11/2017 | |
| WO | WO 2016/017728 A1 | | 2/2016 | |
| WO | WO 2016/194890 A1 | | 12/2016 | |
| WO | WO 2016/194961 A1 | | 12/2016 | |
| WO | WO-2016194961 A1 | * | 12/2016 | ........... G02B 6/0055 |
| WO | WO 2017/199812 A1 | | 11/2017 | |

OTHER PUBLICATIONS

International Preliminary Report on Patentability and Written Opinion of the International Searching Authority with an English translation, dated Jul. 9, 2020, for International Application No. PCT/JP2018/048366.

International Search Report, dated Feb. 5, 2019, for International Application No. PCT/JP2018/048366, with an English translation.

Kress et al., "Towards the Ultimate Mixed Reality Experience: HoloLens Display Architecture Choices," SID 2017 DIGEST, 2017, pp. 127-131.

Chinese Office Action and Search Report for Chinese Application No. 201880084263.1, dated Aug. 18, 2021, with an English translation.

Japanese Decision of Refusal for Japanese Application No. 2019-562484, dated Oct. 19, 2021, with an English translation.

* cited by examiner

OPTICAL ELEMENT, LIGHT GUIDE ELEMENT, AND IMAGE DISPLAY DEVICE

CROSS-REFERENCE TO RELATED APPLICATIONS

This application is a Continuation of PCT International Application No. PCT/JP2018/048366 filed on Dec. 27, 2018, which claims priority under 35 U.S.C. § 119(a) to Japanese Patent Application No. 2017-250971 filed on Dec. 27, 2017, Japanese Patent Application No. 2018-193324 filed on Oct. 12, 2018 and Japanese Patent Application No. 2018-231747 filed on Dec. 11, 2018. Each of the above applications is hereby expressly incorporated by reference, in its entirety, into the present application.

BACKGROUND OF THE INVENTION

1. Field of the Invention

The present invention relates to an optical element that reflects light, a light guide element including the optical element, and an image display device including the light guide element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that is actually being seen by a user.

In AR glasses, light (projection light) projected from a display is diffracted (refracted) using a diffraction element to be incident into one end portion of a light guide plate. As a result, the light is introduced into the light guide plate with an angle such that the light propagates in the light guide plate. The light propagated in the light guide plate is also diffracted by the diffraction element in the other end portion of the light guide plate and is emitted from the light guide plate to an observation position by the user.

As the light guide plate used in the AR glasses, for example, a light guide plate (waveguide) described in US2016/0231568A is known.

This light guide plate includes a front surface and a rear surface from which light is reflected and guided, a first portion that is provided on the front surface or the rear surface, and a second portion that is provided on the front surface or the rear surface. The first portion has a structure which causes light to change phase upon reflection from the first portion by a first amount. In addition, the second portion on the same surface has a different structure which causes light to change phase upon reflection from the second portion by a second amount different from the first amount, the structure different from the first portion. Further, in the light guide plate, the first portion is offset from the second portion by a distance which substantially matches the difference between the second amount and the first amount.

SUMMARY OF THE INVENTION

However, as also described in "0060" of US2016/0231568, an angle of light diffraction by a diffraction element depends on the wavelength of the light. That is, an advancing direction of light diffracted by a diffraction element varies depending on the wavelength of the light.

Accordingly, in a case where light components having different wavelengths are diffracted by one diffraction element to be introduced into a light guide plate and are emitted from the light guide plate, for example, in the case of a color image including a red image, a green image, and a blue image, a so-called color shift in which positions of the red image, the green image, and the blue image are different from each other occurs.

In order to solve the problem, in the AR glasses described in Bernard C. Kress et al., Towards the Ultimate Mixed Reality Experience: HoloLens Display Architecture Choices, SID 2017 DIGEST, pp. 127-131, three elongated light guide plates corresponding to the red image, the green image, and the blue image in which a diffraction element (surface relief grating (SRG)) is provided at opposite ends are prepared, the three light guide plates including the diffraction element are laminated, and a projection image of each of the colors displayed by a display is guided to an observation position by a user such that a color image is displayed.

As a result, in the AR glasses, the positions of the red image, the green image, and the blue image are matched to each other, and a color image having no color shift is displayed.

This way, in the AR glasses of the related art, the image displayed by the display is guided to the observation position by the user. Therefore, it is necessary to laminate the three light guide plates including the diffraction element. Thus, as a whole, the light guide plate is thick and heavy. Further, the device configuration is also complicated.

An object of the present invention is to solve the above-described problem of the related art and to provide an optical element in which a wavelength dependence of a reflection angle is small and for example, red light, green light, and blue light incident from the same direction can be reflected substantially in the same direction, a light guide element including the optical element, and an image display device including the light guide element.

In order to achieve the object, the present invention has the following configurations.

[1] An optical element comprising a plurality of cholesteric liquid crystal layers that are laminated, the cholesteric liquid crystal layers being obtained by immobilizing a cholesteric liquid crystalline phase, in which the plurality of cholesteric liquid crystal layers have different selective reflection center wavelengths, the cholesteric liquid crystal layer has a liquid crystal alignment pattern in which a direction of an optical axis derived from a liquid crystal compound changes while continuously rotating in at least one in-plane direction, and in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths.

[2] The optical element according to claim 1,
in which the plurality of cholesteric liquid crystal layers having different selective reflection center wavelengths are laminated such that the lengths of the selective reflection center wavelengths sequentially increase in a laminating direction of the cholesteric liquid crystal layers.

[3] The optical element according to [1] or [2],
in which the length of the single period in the liquid crystal alignment pattern is 50 μm or less.

[4] The optical element according to any one of [1] to [3] comprising cholesteric liquid crystal layers having the same selective reflection center wavelength and different directions of circularly polarized light to be reflected.

[5] The optical element according to [4],
in which in the cholesteric liquid crystal layers having the same selective reflection center wavelength and different directions of circularly polarized light to be reflected, rotation directions in which the direction of the optical axis derived from the liquid crystal compound is continuous in the liquid crystal alignment pattern are different from each other.

[6] The optical element according to any one of [1] to [5],
in which at least one of the cholesteric liquid crystal layers has in-plane regions having different lengths of the single periods in the liquid crystal alignment pattern.

[7] The optical element according to [6],
in which the length of the single period in the liquid crystal alignment pattern of the cholesteric liquid crystal layer decreases in the in-plane direction in which the direction of the optical axis derived from the liquid crystal compound changes while continuously rotating.

[8] The optical element according to any one of [1] to [7],
in which the liquid crystal alignment pattern of the cholesteric liquid crystal layer is a concentric circular pattern having a concentric circular shape where the in-plane direction in which the direction of the optical axis derived from the liquid crystal compound changes while continuously rotating moves from an inside toward an outside.

[9] The optical element according to any one of [1] to [8] comprising three or more cholesteric liquid crystal layers having different selective reflection center wavelengths.

[10] The optical element according to [9], comprising at least a cholesteric liquid crystal layer having a selective reflection center wavelength in a red light wavelength range, a cholesteric liquid crystal layer having a selective reflection center wavelength in a green light wavelength range, and a cholesteric liquid crystal layer having a selective reflection center wavelength in a blue light wavelength range.

[11] The optical element according to any one of [1] to [10], comprising an alignment film that is provided between at least one set of cholesteric liquid crystal layers, in which at least one surface of at least one alignment film between the cholesteric liquid crystal layers is in contact with the cholesteric liquid crystal layer.

[12] The optical element according to [11],
in which both surfaces of at least one alignment film between the cholesteric liquid crystal layers are in contact with the cholesteric liquid crystal layers.

[13] A light guide element comprising:
the optical element according to any one of [1] to [12]; and
a light guide plate.

[14] The light guide element according to [13],
in which two optical elements spaced from each other are provided in the light guide plate.

[15] The light guide element according to [13],
in which three or more optical elements spaced from each other are provided in the light guide plate.

[16] The light guide element according to [15], comprising:
a first optical element that allows light to be incident into the light guide plate, a third optical element that emits light from the light guide plate, and a second optical element that reflects light reflected from the first optical element to the third optical element,
in which among the cholesteric liquid crystal layers included in the first optical element, the second optical element, and the third optical element, the length of the single period in the liquid crystal alignment pattern of the cholesteric liquid crystal layer having a longest selective reflection center wavelength is the shortest in the second optical element.

[17] An image display device comprising:
the light guide element according to any one of [13] to [16]; and
a display element that emits an image to the optical element of the light guide element.

[18] The image display device according to [17],
in which the display element emits circularly polarized light to the optical element of the light guide element.

In the optical element according to the present invention, the wavelength dependence of the reflection angle is small, and for example, red light, green light, and blue light incident from the same direction substantially can be reflected in the same direction. In addition, in the light guide element according to the present invention including the above-described optical element, with one light guide plate, a plurality of light components having different wavelengths can be guided and emitted without a color shift. Further, in the image display device according to the present invention including the above-described light guide element, an image having no color shift can be displayed at a wide viewing angle.

DESCRIPTION OF THE PREFERRED EMBODIMENTS

Figure 1:
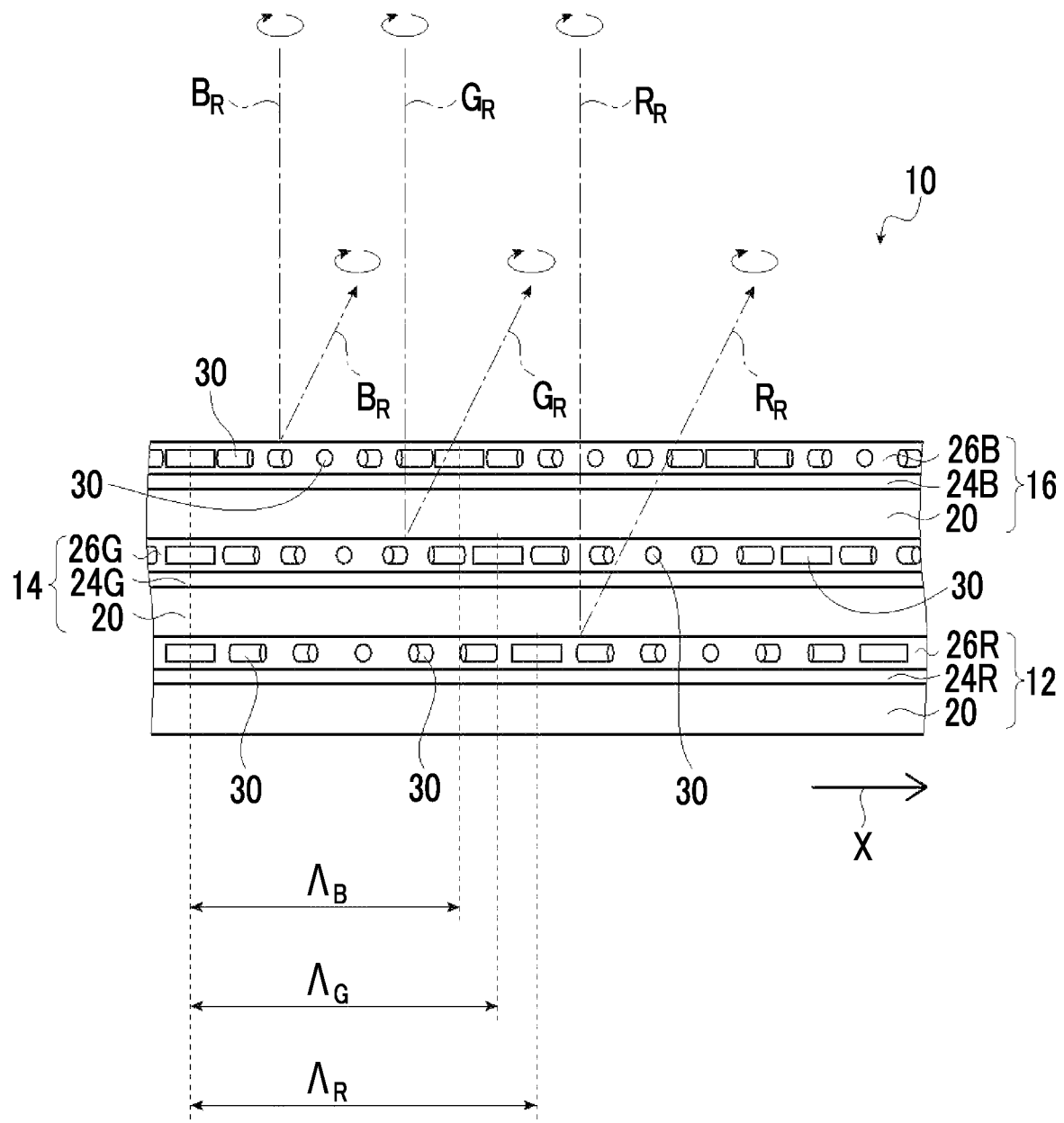
FIG. 1 is a diagram conceptually showing an example of an optical element according to the present invention.

Hereinafter, an optical element, a light guide element, and an image display device according to an embodiment of the present invention will be described in detail based on a preferable embodiment shown in the accompanying drawings.

In this specification, numerical ranges represented by "to" include numerical values before and after "to" as lower limit values and upper limit values.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In this specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

Expression for obtaining Half Value Transmittance:

$$T1/2=100-(100-Tmin)\div 2$$

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

The optical element according to the embodiment of the present invention is a light reflection element that reflects incident light and has a configuration in which a plurality of cholesteric liquid crystal layers obtained by immobilizing a cholesteric liquid crystalline phase are laminated, in which the plurality of cholesteric liquid crystal layers have different selective reflection center wavelengths.

In addition, the cholesteric liquid crystal layer has a liquid crystal alignment pattern in which a direction of an optical axis derived from a liquid crystal compound continuously rotates in one in-plane direction.

Further, a permutation of lengths of the selective reflection center wavelengths and a permutation of lengths of rotation periods of the optical axes in the liquid crystal alignment pattern match each other in the plurality of cholesteric liquid crystal layers. That is, in the optical element according to the embodiment of the present invention, as the length of the selective reflection center wavelength in the cholesteric liquid crystal layer increases, the length of the rotation period of the optical axis in the liquid crystal alignment pattern increases. As the length of the selective reflection center wavelength in the cholesteric liquid crystal layer decreases, the length of the rotation period of the optical axis in the liquid crystal alignment pattern decreases.

Although described below in detail, the optical element according to the embodiment of the present invention has the above-described configuration such that a wavelength dependence of a reflection angle is small, and light components having different wavelengths incident from the same direction can be reflected substantially in the same direction.

FIG. 1 is a diagram conceptually showing an example of the optical element according to the embodiment of the present invention.

An optical element 10 shown in the drawing includes: an R reflecting layer 12 that selectively reflects red light; a G reflecting layer 14 that selectively reflects green light; and a B reflecting layer 16 that selectively reflects blue light.

As described above, the optical element according to the embodiment of the present invention has the configuration in which a plurality of cholesteric liquid crystal layers having different selective reflection center wavelengths are laminated. The R reflecting layer 12 includes a support 20, an R alignment film 24R, and an R reflection cholesteric liquid crystal layer 26R. The G reflecting layer 14 includes a support 20, a G alignment film 24G, and a G reflection cholesteric liquid crystal layer 26G. Further, the B reflecting layer 16 includes a support 20, a B alignment film 24B, and a B reflection cholesteric liquid crystal layer 26B.

Although not shown in the drawing, the R reflecting layer 12 and the G reflecting layer 14, and the G reflecting layer 14 and the B reflecting layer 16 are bonded to each other through bonding layers provided therebetween, respectively.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the R reflecting layer 12, the G reflecting layer 14, and the B reflecting layer 16 may be laminated and held by a frame, a holding device, or the like to configure the optical element according to the embodiment of the present invention.

In addition, the optical element 10 shown in the drawing includes the support 20 for each of the reflecting layers. However, the optical element according to the embodiment of the present invention does not necessarily include the support 20 for each of the reflecting layers.

For example, the optical element according to the embodiment of the present invention may have a configuration in which the G alignment film 24G is formed on a surface of the R reflecting layer 12 (R reflection cholesteric liquid crystal layer 26R), the G reflection cholesteric liquid crystal layer 26G is formed thereon, the B alignment film 24B is formed on a surface of the G reflection cholesteric liquid crystal layer 26G, and the B reflection cholesteric liquid crystal layer 26B is formed thereon.

Alternatively, the support 20 of the R reflecting layer 12 may be removed from the above-described configuration such that only the alignment film and the cholesteric liquid crystal layer or only the cholesteric liquid crystal layer configures the optical element according to the embodiment of the present invention.

That is, in the optical element 10 shown in FIG. 1, the cholesteric liquid crystal layer is in contact with only one surface (one interface) of the alignment film, but the present invention is not limited thereto. The optical element according to the embodiment of the present invention may have a configuration in which at least one alignment film includes cholesteric liquid crystal layers in contact with both surfaces (both interfaces) thereof. In other words, in the optical element according to the embodiment of the present invention, at least one cholesteric liquid crystal layer may include alignment films in contact with both surfaces thereof. That is, the optical element according to the embodiment of the present invention may have a configuration in which an alignment film is formed directly on a surface of a cholesteric liquid crystal layer, and another cholesteric liquid crystal layer is formed on another surface of the alignment film.

The configuration in which the cholesteric liquid crystal layers are provided on both surfaces of the alignment film, that is, the configuration in which the alignment film is provided directly on the surface of the cholesteric liquid crystal layer can be prepared using a well-known method. For example, a preparation method including: forming a photo-alignment film on a surface of a cholesteric liquid crystal layer using a coating method; forming an alignment pattern on the photo-alignment film by exposure; and forming another cholesteric liquid crystal layer on another surface of the photo-alignment film using a coating method can be used. The formation of the photo-alignment film and the cholesteric liquid crystal layer using a coating method and the exposure of the photo-alignment film will be described below.

That is, in the optical element according to the embodiment of the present invention, various layer configurations can be used as long as the plurality of cholesteric liquid crystal layers having different selective reflection center wavelengths are provided, each of the cholesteric liquid crystal layers having different selective reflection center wavelengths has a liquid crystal alignment pattern in which a direction of an optical axis derived from a liquid crystal compound rotates in one in-plane direction, and the selective reflection center wavelength and the rotation period of the optical axis in the liquid crystal alignment pattern satisfy a predetermined relationship.

<Support>

In the R reflecting layer 12, the G reflecting layer 14, and the B reflecting layer 16, the support 20 support the R alignment film 24R, the G alignment film 24G, and the B alignment film 24B and the R reflection cholesteric liquid crystal layer 26R, the G reflection cholesteric liquid crystal layer 26G, and the B reflection cholesteric liquid crystal layer 26B, respectively.

In the following description, in a case where it is not necessary to distinguish between the R alignment film 24R, the G alignment film 24G, and the B alignment film 24B, the R alignment film 24R, the G alignment film 24G, and the B alignment film 24B will also be collectively referred to as "alignment film". In addition, in a case where it is not necessary to distinguish between the R reflection cholesteric liquid crystal layer 26R, the G reflection cholesteric liquid crystal layer 26G, and the B reflection cholesteric liquid crystal layer 26B, the R reflection cholesteric liquid crystal layer 26R, the G reflection cholesteric liquid crystal layer 26G, and the B reflection cholesteric liquid crystal layer 26B will also be collectively referred to as "cholesteric liquid crystal layer".

As the support 20, various sheet-shaped materials (films or plate-shaped materials) can be used as long as they can support the alignment film and the cholesteric liquid crystal layer.

A transmittance of the support 20 with respect to corresponding light is preferably 50% or higher, more preferably 70% or higher, and still more preferably 85% or higher.

The thickness of the support 20 is not particularly limited and may be appropriately set depending on the use of the optical element 10, a material for forming the support 20, and the like in a range where the alignment film and the cholesteric liquid crystal layer can be supported.

The thickness of the support 20 is preferably 1 to 1000 µm, more preferably 3 to 250 µm, and still more preferably 5 to 150 µm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.

<Alignment Film>

In the R reflecting layer 12, the R alignment film 24R is formed on the surface of the support 20. In the G reflecting layer 14, the G alignment film 24G is formed on the surface of the support 20. In the B reflecting layer 16, the B alignment film 24B is formed on the surface of the support 20.

The R alignment film 24R is an alignment film for aligning the liquid crystal compound 30 to a predetermined liquid crystal alignment pattern during the formation of the R reflection cholesteric liquid crystal layer 26R of the R reflecting layer 12. The G alignment film 24G is an alignment film for aligning the liquid crystal compound 30 to a predetermined liquid crystal alignment pattern during the formation of the G reflection cholesteric liquid crystal layer 26G of the G reflecting layer 14. The B alignment film 24B is an alignment film for aligning the liquid crystal compound 30 to a predetermined liquid crystal alignment pattern during the formation of the B reflection cholesteric liquid crystal layer 26B of the B reflecting layer 16.

Although described below, in the optical element 10 according to the embodiment of the present invention, the cholesteric liquid crystal layer has a liquid crystal alignment pattern in which a direction of an optical axis 30A (refer to FIG. 3) derived from the liquid crystal compound 30 changes while continuously rotating in one in-plane direction.

Further, in a case where, in the liquid crystal alignment pattern, a length over which the direction of the optical axis 30A rotates by 180° in the in-plane direction in which the direction of the optical axis 30A changes while continuously rotating is set as a single period A (a rotation period of the optical axis), a permutation of lengths of selective reflection center wavelengths and a permutation of lengths of the single periods match each other in the cholesteric liquid crystal layers. That is, in the optical element 10, the selective reflection center wavelengths of the respective cholesteric liquid crystal layers satisfy "R reflection cholesteric liquid crystal layer 26R>G reflection cholesteric liquid crystal layer 26G>B reflection cholesteric liquid crystal layer 26B". The lengths of the single periods A of the liquid crystal alignment patterns of the respective cholesteric liquid crystal layers satisfy "R reflection cholesteric liquid crystal layer 26R>G reflection cholesteric liquid crystal layer 26G>B reflection cholesteric liquid crystal layer 26B".

Accordingly, the alignment film of each of the reflecting layers is formed such that each of the cholesteric liquid crystal layers can form the liquid crystal alignment pattern.

In the following description, "the direction of the optical axis 30A rotates" will also be referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 5:
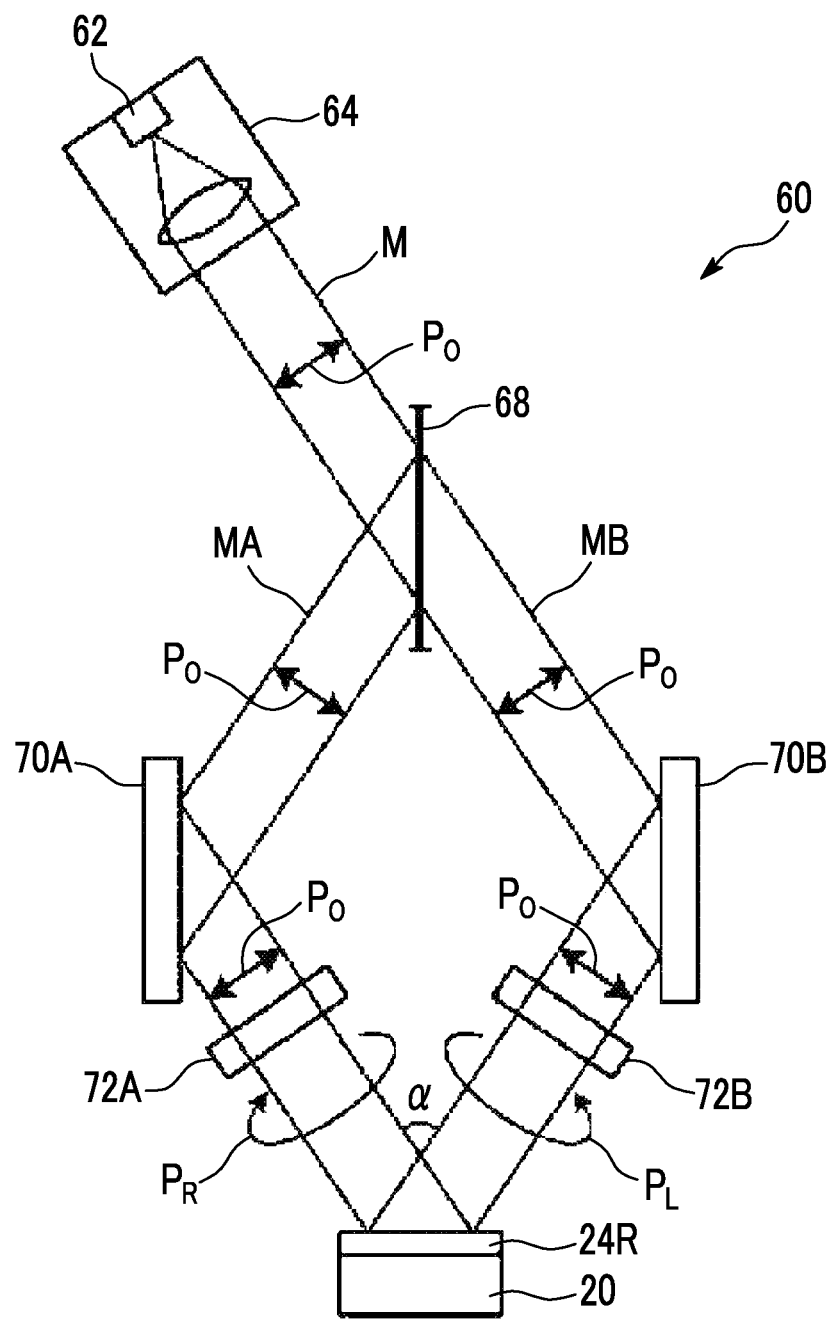
FIG. 5 is a conceptual diagram showing one example of an exposure device that exposes an alignment film of the optical element shown in FIG. 1.

FIG. 5 conceptually shows an example of an exposure device that exposes the alignment film to form an alignment pattern. FIG. 5 shows the example of forming the R alignment film 24R of the R reflecting layer 12. However, in the G alignment film 24G of the G reflecting layer 14 and the B alignment film 24B of the B reflecting layer 16, an alignment pattern can also be formed using the same exposure device.

An exposure device 60 shown in FIG. 5 includes: a light source 64 that includes a laser 62; a polarization beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The λ/4 plates 72A and 72B used herein are not particularly limited as long as they are λ/4 plates corresponding to wavelengths of light to be emitted. The exposure device 60 emits the laser light M. Therefore, for example, in a case where the center wavelength of the laser light M is 325 nm, a λ/4 plate that functions with respect to light having a wavelength of 325 nm may be used.

The support 20 including the R alignment film 24R on which the alignment pattern is not yet formed is disposed at an exposed portion, the two beams MA and MB intersect and interfere each other on the R alignment film 24R, and the R alignment film 24R is irradiated with and exposed to the interference light.

Due to the interference at this time, the polarization state of light with which the R alignment film 24R is irradiated periodically changes according to interference fringes. As a result, in the R alignment film 24R, an alignment pattern in which the alignment state periodically changes can be obtained.

In the exposure device 60, by changing an intersection angle α between the two beams MA and MB, the period of the alignment pattern can be adjusted. That is, by adjusting the intersection angle α in the exposure device 60, in the alignment pattern in which the optical axis 30A derived from the liquid crystal compound 30 continuously rotates in the in-plane direction, the length of the single period over which the optical axis 30A rotates by 180° in the in-plane direction in which the optical axis 30A rotates can be adjusted.

By forming the cholesteric liquid crystal layer on the alignment film having the alignment pattern in which the alignment state periodically changes, as described below, the R reflection cholesteric liquid crystal layer 26R having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the R reflection cholesteric liquid crystal layer 26R or the like has the liquid crystal alignment pattern in which the direction of the optical axis 30A derived from the liquid crystal compound 30 changes while continuously rotating in at least one in-plane direction.

<Cholesteric Liquid Crystal Layer>

In the R reflecting layer 12, the R reflection cholesteric liquid crystal layer 26R is formed on the surface of the R alignment film 24R. In the G reflecting layer 14, the G reflection cholesteric liquid crystal layer 26G is formed on the surface of the G alignment film 24G. Further, in the B reflecting layer 16, the B reflection cholesteric liquid crystal layer 26B is formed on the surface of the B alignment film 24B.

In FIG. 1, in order to simplify the drawing and to clarify the configuration of the optical element 10, only the liquid crystal compound 30 (liquid crystal compound molecules) on the surface of the alignment film in the R reflection cholesteric liquid crystal layer 26R, the G reflection cholesteric liquid crystal layer 26G, and the B reflection cholesteric liquid crystal layer 26B is conceptually shown. However, as conceptually shown in FIG. 2 using the R reflection cholesteric liquid crystal layer 26R, each of the R reflection cholesteric liquid crystal layer 26R, the G reflection cholesteric liquid crystal layer 26G, and the B reflection cholesteric liquid crystal layer 26B has a helical structure in which the liquid crystal compound 30 is helically turned and laminated as in a cholesteric liquid crystal layer obtained by immobilizing a typical cholesteric liquid crystalline phase. In the helical structure, a configuration in which the liquid crystal compound 30 is helically rotated once (rotated by 360) is set as one helical pitch, and plural pitches of the helically turned liquid crystal compound 30 are laminated.

The R reflection cholesteric liquid crystal layer 26R, the G reflection cholesteric liquid crystal layer 26G, and the B reflection cholesteric liquid crystal layer 26B have wavelength selective reflection properties.

The R reflection cholesteric liquid crystal layer 26R reflects right circularly polarized light $R_R$ of red light and allows transmission of the other light. Therefore, the R reflection cholesteric liquid crystal layer 26R has a selective reflection center wavelength in a red light wavelength range.

The G reflection cholesteric liquid crystal layer 26G reflects right circularly polarized light $G_R$ of green light and allows transmission of the other light. Therefore, the G reflection cholesteric liquid crystal layer 26G has a selective reflection center wavelength in a green light wavelength range.

The B reflection cholesteric liquid crystal layer 26B reflects right circularly polarized light $B_R$ of blue light and allows transmission of the other light. Therefore, the B reflection cholesteric liquid crystal layer 26B has a selective reflection center wavelength in a blue light wavelength range.

As described above, the R reflection cholesteric liquid crystal layer 26R, the G reflection cholesteric liquid crystal layer 26G, and the B reflection cholesteric liquid crystal layer 26B are obtained by immobilizing a cholesteric liquid crystalline phase.

That is, the R reflection cholesteric liquid crystal layer 26R, the G reflection cholesteric liquid crystal layer 26G, and the B reflection cholesteric liquid crystal layer 26B are formed of the liquid crystal compound 30 (liquid crystal material) having a cholesteric structure.

<<Cholesteric Liquid Crystalline Phase>>

The cholesteric liquid crystalline phase exhibits selective reflection properties with respect to left or circularly polarized light at a specific wavelength. Whether or not the reflected light is right circularly polarized light or left circularly polarized light is determined depending on a helical twisting direction (sense) of the cholesteric liquid crystalline phase. Regarding the selective reflection of the circularly polarized light by the cholesteric liquid crystalline phase, in a case where the helical twisting direction of the cholesteric liquid crystalline phase is right, right circularly polarized light is reflected, and in a case where the helical twisting direction of the cholesteric liquid crystalline phase is left, left circularly polarized light is reflected.

Accordingly, in the optical element 10 shown in the drawing, the cholesteric liquid crystal layer is a layer obtained by immobilizing a right-twisted cholesteric liquid crystalline phase.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width (nm) of a selective reflection range (circularly polarized light reflection range) where selective reflection is exhibited depends on Δn of the cholesteric liquid crystalline phase and the helical pitch P and complies with a relationship of $\Delta\lambda=\Delta n \times P$. Therefore, the width of the selective reflection range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and is, for example, 10 to 500 nm and preferably 20 to 300 nm and more preferably 30 to 100 nm.

<<Method of Forming Cholesteric Liquid Crystal Layer>>

The cholesteric liquid crystal layer (the R reflection cholesteric liquid crystal layer 26R, the G reflection cholesteric liquid crystal layer 26G, and the B reflection cholesteric liquid crystal layer 26B) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

It is preferable that the liquid crystal composition is used as a liquid during the formation of the cholesteric liquid crystal layer (the R reflection cholesteric liquid crystal layer 26R, the G reflection cholesteric liquid crystal layer 26G, and the B reflection cholesteric liquid crystal layer 26B).

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film, it is preferable that the cholesteric liquid crystal layer obtained by immobilizing a cholesteric liquid cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical element 10, the light reflectivity required for the cholesteric liquid crystal layer, the material for forming the cholesteric liquid crystal layer, and the like.

<<Liquid Crystal Alignment Pattern of Cholesteric Liquid Crystal Layer>>

As described above, in the optical element 10 according to the embodiment of the present invention, the cholesteric liquid crystal layer (the R reflection cholesteric liquid crystal layer 26R, the G reflection cholesteric liquid crystal layer 26G, and the B reflection cholesteric liquid crystal layer 26B) has the liquid crystal alignment pattern in which the direction of the optical axis 30A derived from the liquid crystal compound 30 forming the cholesteric liquid crystalline phase changes while continuously rotating in the in-plane direction of the cholesteric liquid crystal layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

Figure 3:
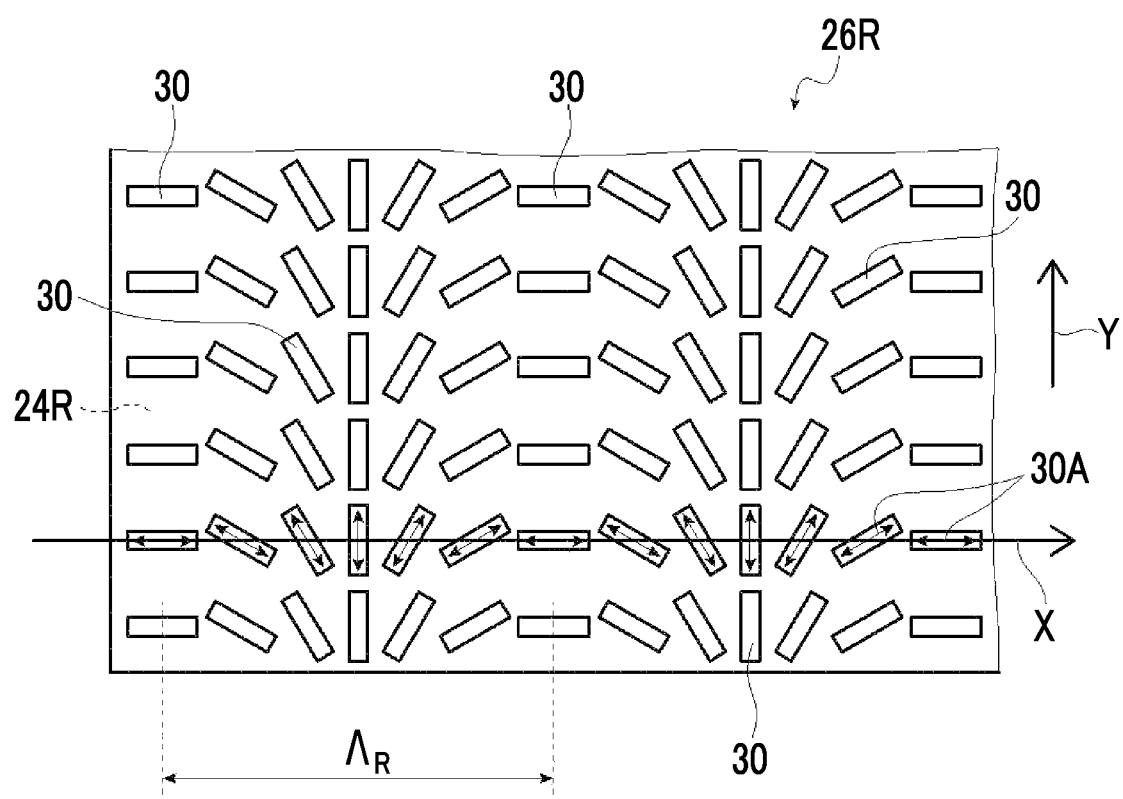
FIG. 3 is a plan view showing the cholesteric liquid crystal layer of the optical element shown in FIG. 1.

FIG. 3 conceptually shows a plan view of the R reflection cholesteric liquid crystal layer 26R.

The plan view is a view in a case where the optical element 10 is seen from the top, that is, a view in a case where the optical element 10 is seen from a thickness direction. In other words, the thickness direction of the optical element 10 is a laminating direction of the respective layers (films).

In addition, in FIG. 3, in order to clarify the configuration of the optical element 10 according to the embodiment of the present invention, only the liquid crystal compound 30 on the surface of the R alignment film 24R is shown as in FIG. 1.

FIG. 3 shows the R reflection cholesteric liquid crystal layer 26R as a representative example. However, basically, the G reflection cholesteric liquid crystal layer 26G and the B reflection cholesteric liquid crystal layer 26B also have the same configuration and the same effects as those of the R reflection cholesteric liquid crystal layer 26R, the lengths A of the single period of the liquid crystal alignment patterns described below are different from each other.

As shown in FIG. 3, on the surface of the R alignment film 24R, the liquid crystal compound 30 forming the R reflection cholesteric liquid crystal layer 26R is two-dimensionally arranged according to the alignment pattern formed on the R alignment film 24R as the lower layer in a predetermined in-plane direction indicated by arrow X and a direction perpendicular to the in-plane direction (arrow X direction).

Figure 4:
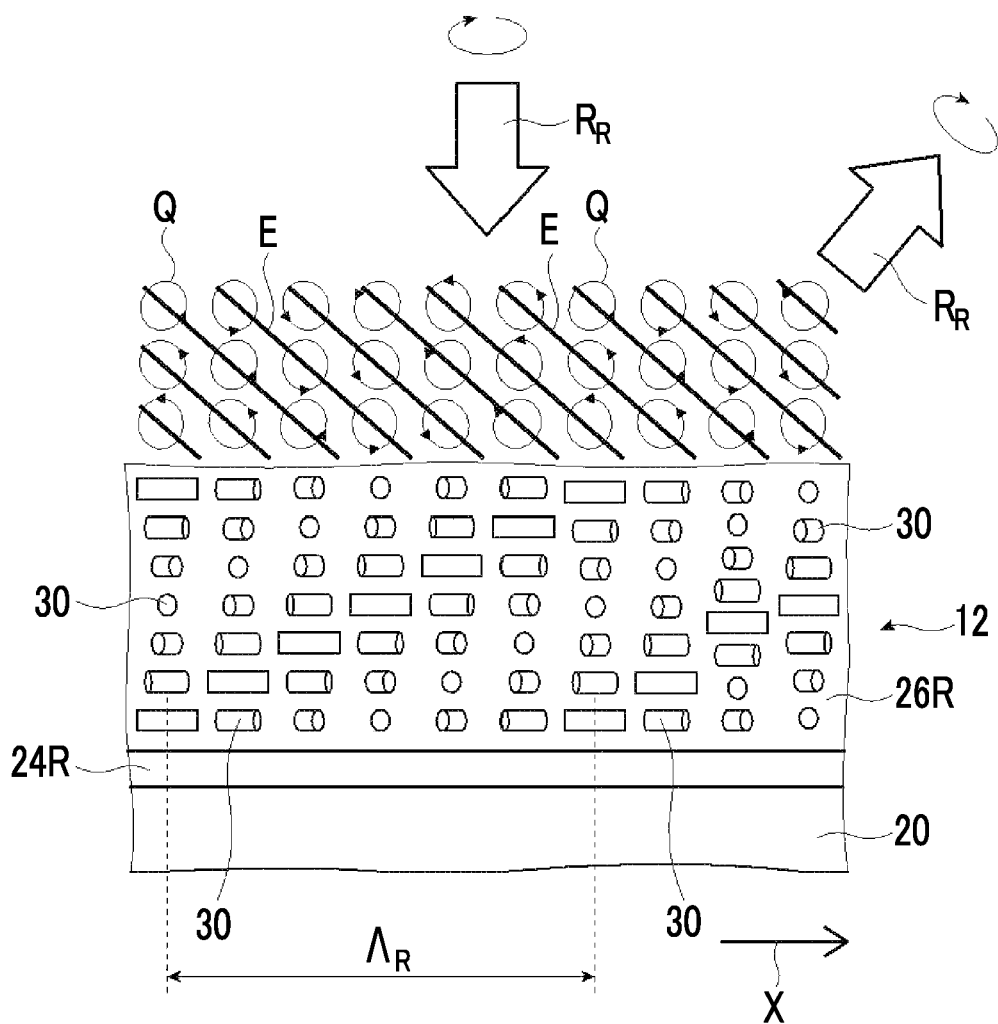
FIG. 4 is a conceptual diagram showing an action of the cholesteric liquid crystal layer of the optical element shown in FIG. 1.

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 30 forming the R reflection cholesteric liquid crystal layer 26R has the liquid crystal alignment pattern in which the direction of the optical axis 30A changes while continuously rotating in the arrow X direction in a plane of the R reflection cholesteric liquid crystal layer 26R. In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the R reflection cholesteric liquid crystal layer 26R, the directions of the optical axes 30A are the same in the Y direction perpendicular to the arrow X direction, that is, the Y direction perpendicular to the in-plane direction in which the optical axis 30A continuously rotates.

In other words, in the liquid crystal compound 30 forming the R reflection cholesteric liquid crystal layer 26R, angles between the optical axes 30A of the liquid crystal compound 30 and the arrow X direction are the same in the Y direction.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating is the length $\Lambda$ ($\Lambda_R$) of the single period in the liquid crystal alignment pattern.

That is, a distance between centers of two liquid crystal compounds 30 in the arrow X direction is the length $\Lambda$ of the single period, the two liquid crystal compounds having the same angle in the arrow X direction. Specifically, as shown in FIG. 3, a distance of centers of two liquid crystal compounds 30 in which the arrow X direction and the direction of the optical axis 30A in the arrow X direction is the length $\Lambda$ of the single period. In the following description, the length $\Lambda$ of the single period will also be referred to as "single period $\Lambda$".

In addition, in the following description, in order to distinguish between the single periods $\Lambda$ of the respective cholesteric liquid crystal layers, the single period $\Lambda$ in the R reflection cholesteric liquid crystal layer 26R will also be referred to as "$\Lambda_R$", the single period $\Lambda$ in the G reflection cholesteric liquid crystal layer 26G will also be referred to as "$\Lambda_G$", and the single period $\Lambda$ in the B reflection cholesteric liquid crystal layer 26B will also be referred to as "$\Lambda_B$".

In the optical element 10 according to the embodiment of the present invention, in the liquid crystal alignment pattern of the cholesteric liquid crystal layer, the single period $\Lambda$ is repeated in the arrow X direction, that is, in the in-plane direction in which the direction of the optical axis 30A changes while continuously rotating.

The cholesteric liquid crystal layer obtained by immobilizing a cholesteric liquid crystalline phase typically reflects incident light (circularly polarized light) by specular reflection.

On the other hand, the R reflection cholesteric liquid crystal layer 26R reflects incidence light in a direction having an angle in the arrow X direction with respect to the incidence light. The R reflection cholesteric liquid crystal layer 26R has the liquid crystal alignment pattern in which the optical axis 30A changes while continuously rotating in the arrow X direction in a plane (the predetermined in-plane direction). Hereinafter, the description will be made with reference to FIG. 4.

As described above, the R reflection cholesteric liquid crystal layer 26R selectively reflects right circularly polarized light $R_R$ of red light. Accordingly, in a case where light is incident into the R reflecting layer 12, the R reflection cholesteric liquid crystal layer 26R reflects only right circularly polarized light $R_R$ of red light and allows transmission of the other light.

In a case where the right circularly polarized light $R_R$ of red light incident into the R reflection cholesteric liquid crystal layer 26R is reflected from the R reflection cholesteric liquid crystal layer 26R, the absolute phase changes depending on the directions of the optical axes 30A of the respective liquid crystal compounds 30.

Here, in the R reflection cholesteric liquid crystal layer 26R, the optical axis 30A of the liquid crystal compound 30 changes while rotating in the arrow X direction (the in-plane direction). Therefore, the amount of change in the absolute phase of the incident right circularly polarized light $R_R$ of red light varies depending on the directions of the optical axes 30A.

Further, the liquid crystal alignment pattern formed in the R reflection cholesteric liquid crystal layer 26R is a pattern that is periodic in the arrow X direction. Therefore, as conceptually shown in FIG. 4, an absolute phase Q that is periodic in the arrow X direction corresponding to the direction of the optical axis 30A is assigned to the right circularly polarized light $R_R$ of red light incident into the R reflection cholesteric liquid crystal layer 26R.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the R reflection cholesteric liquid crystal layer 26R, an equiphase surface E that is tilted in the arrow X direction with respect to an XY plane is formed for the right circularly polarized light $R_R$ of red light.

Therefore, the right circularly polarized light $R_R$ of red light is reflected in the normal direction of the equiphase surface E, and the reflected right circularly polarized light $R_R$ of red light is reflected in a direction that is tilted in the arrow X direction with respect to the XY plane (main surface of the R reflection cholesteric liquid crystal layer 26R).

Here, a reflection angle of light from the cholesteric liquid crystal layer in which the optical axis 30A of the liquid crystal compound 30 continuously rotates in the in-plane direction (arrow X direction) varies depending on wavelengths of light to be reflected. Specifically, as the wavelength of light increases, the angle of reflected light with respect to incidence light increases. Accordingly, in a case where red light, green light, and blue light are reflected as in the optical element shown in FIG. 1, the reflection angles of red light, green light, and blue light are different from each other. Specifically, in a case where cholesteric reflecting layers having the same pitch $\Lambda$ of the liquid crystal alignment pattern and having reflection center wavelengths in red, green, blue light ranges are compared to each other, regarding the angle of reflected light with respect to incidence light, the angle of red light is the largest, the angle of green light is the second largest, and the angle of blue light is the smallest.

Therefore, for example, in a light guide plate of AR glasses, in a case where a reflection element that are formed of cholesteric liquid crystal layers having the same single period $\Lambda$ of the liquid crystal alignment pattern and different reflection center wavelengths is used as a diffraction element for incidence and emission of light into and from the light guide plate, in the case of a full color image, an image having a so-called color shift in which reflection directions of red light, green light, and blue light are different from each other and a red image, a green image, and a blue image do not match each other is observed.

By providing a light guide plate for each of a red image, a green image, and a blue image as described in Bernard C. Kress et al., Towards the Ultimate Mixed Reality Experience: HoloLens Display Architecture Choices, SID 2017 DIGEST, pp. 127-131 and laminating the three light guide plates, the color shift can be resolved. However, in this configuration, as a whole, the light guide plate is thick and heavy. Further, the configuration is also complicated.

Here, a reflection angle of light from the cholesteric liquid crystal layer in which the optical axis 30A of the liquid crystal compound 30 continuously rotates in the arrow X direction (in-plane direction) varies depending on the length $\Lambda$ of the single period of the liquid crystal alignment pattern over which the optical axis 30A rotates by 180° in the arrow X direction, that is, depending on the single period $\Lambda$.

Specifically, as the length of the single period Λ decreases, the angle of reflected light with respect to incidence light increases.

The present invention has been made based on these findings, and a permutation of lengths of the selective reflection center wavelengths and a permutation of lengths of the single periods Λ match each other in the plurality of cholesteric liquid crystal layers having different selective reflection center wavelengths.

That is, in a case where the selective reflection center wavelength of the R reflection cholesteric liquid crystal layer 26R is represented by $\lambda_R$, the selective reflection center wavelength of the G reflection cholesteric liquid crystal layer 26G is represented by $\lambda_G$, and the selective reflection center wavelength of the B reflection cholesteric liquid crystal layer 26B is represented by $\lambda_B$, in the optical element 10 shown in the drawing, the selective reflection center wavelengths satisfy "$\lambda_R > \lambda_G > \lambda_B$". Therefore, the single periods Λ of the liquid crystal alignment patterns of the respective cholesteric liquid crystal layers satisfy "single period $\Lambda_R$>single period $\Lambda_G$>single period $\Lambda_B$" as shown in FIG. 1.

As described above, as the wavelength of light increases, the reflection angle with respect to an incidence direction of light into the cholesteric liquid crystal layer in which the optical axis 30A of the liquid crystal compound 30 rotates increases. On the other hand, as the length of the single period Λ decreases, the reflection angle with respect to an incidence direction of light into the cholesteric liquid crystal layer in which the optical axis 30A of the liquid crystal compound 30 rotates increases.

Accordingly, in the optical element 10 according to the embodiment of the present invention in which a permutation of lengths of the selective reflection center wavelengths and a permutation of lengths of the single periods Λ match each other in the plurality of cholesteric liquid crystal layers having different selective reflection center wavelengths, the wavelength dependence of the reflection angle of light is significantly reduced, and light components having different wavelengths can be reflected substantially in the same direction. Therefore, by using the optical element 10 according to the embodiment of the present invention as a member for incidence and emission into and from a light guide plate, for example, in AR glasses, a red image, a green image, and a blue image can be propagated by one light guide plate without the occurrence of a color shift. As a result, an appropriate image can be displayed to a user.

Further, in the optical element 10 according to the embodiment of the present invention, light is reflected by the cholesteric liquid crystal layer. Therefore, by adjusting the single period Λ in the liquid crystal alignment pattern, the reflection angle of light can be adjusted with a high degree of freedom.

In the optical element 10 according to the embodiment of the present invention, the selective reflection center wavelength of the cholesteric liquid crystal layer and the single period Λ of the liquid crystal alignment pattern are not particularly limited as long as permutations thereof in a plurality of cholesteric liquid crystal layers having different selective reflection center wavelengths match each other.

Here, in a case where the optical element 10 according to the embodiment of the present invention is seen from one surface in the laminating direction of the cholesteric liquid crystal layers, a selective reflection center wavelength of a first cholesteric liquid crystal layer is represented by $\lambda_1$;

a selective reflection center wavelength of an n-th (n represents an integer of 2 or more) cholesteric liquid crystal layer is represented by $\lambda_n$;

a single period Λ in a liquid crystal alignment pattern of the first cholesteric liquid crystal layer is represented by $\Lambda_1$; and a single period Λ in a liquid crystal alignment pattern of the n-th cholesteric liquid crystal layer is represented by $\Lambda_n$.

In this case, it is preferable that the following Expression (1) is satisfied.

$$0.8 \times [(\lambda_n/\lambda_1)\Lambda_1] \leq \Lambda_n \leq 1.2 \times [(\lambda_n/\lambda_1)\Lambda_1] \qquad \text{Expression (1)}$$

In addition, it is more preferable that the optical element according to the embodiment of the present invention satisfies the following Expression (2).

$$0.9 \times [(\lambda_n/\lambda_1)\Lambda_1] \leq \Lambda_n \leq 1.1 \times [(\lambda_n/\lambda_1)\Lambda_1] \qquad \text{Expression (2)}$$

Further, it is still more preferable that the optical element according to the embodiment of the present invention satisfies the following Expression (3).

$$0.95 \times [(\lambda_n/\lambda_1)\Lambda_1] \leq \Lambda_n \leq 1.05 \times [(\lambda_n/\lambda_1)\Lambda_1] \qquad \text{Expression (3)}$$

By adjusting the selective reflection center wavelengths λ and the single periods Λ of the liquid crystal alignment patterns in the respective cholesteric liquid crystal layers to satisfy the Expression (1), reflection angles of light components having respective wavelengths can be more suitably matched, and the wavelength dependence of the reflection angle of light can be further reduced.

In the optical element 10 according to the embodiment of the present invention, the laminating order of the cholesteric liquid crystal layers is not particularly limited.

Here, in the present invention, it is preferable that the cholesteric liquid crystal layers are laminated such that the selective reflection center wavelength sequentially increases in the laminating direction of the cholesteric liquid crystal layer as in the optical element 10 of FIG. 1.

In the reflection of light from the cholesteric liquid crystal layer, a so-called blue shift (short-wavelength shift) in which the wavelength of light to be selectively reflected shifts to a short wavelength side occurs depending on angles of incidence light. On the other hand, by laminating the cholesteric liquid crystal layers in the order of selective reflection center wavelengths, a side where the selective reflection center wavelength is short is set as a light incidence side such that the influence of the blue shift can be reduced.

In the optical element 10 according to the embodiment of the present invention, the single period Λ in the alignment pattern of the cholesteric liquid crystal layer is not particularly limited and may be appropriately set depending on the use of the optical element 10 and the like.

Here, the optical element 10 according to the embodiment of the present invention can be suitably used as, for example, a diffraction element that reflects light displayed by a display to be guided to a light guide plate in AR glasses or a diffraction element that emits light propagated in a light guide plate to an observation position by a user from the light guide plate.

At this time, in order to totally reflect light from the light guide plate, it is necessary to reflect light to be guided to the light guide plate at a large angle to some degree with respect to incidence light. In addition, in order to reliably emit light propagated in the light guide plate, it is necessary to reflect at a large angle to some degree with respect to incidence light.

In addition, as described above, the reflection angle from the cholesteric liquid crystal layer with respect to incidence light can be increased by reducing the single period Λ in the liquid crystal alignment pattern.

In consideration of this point, the single period Λ in the liquid crystal alignment pattern of the cholesteric liquid crystal layer is preferably 50 μm or less and more preferably 10 μm or less. In a case where light is totally reflected by the light guide plate, the single period Λ in the liquid crystal alignment pattern of the cholesteric liquid crystal layer is preferably 1 μm or less and more preferably a wavelength λ μm or less of incident light.

In consideration of the accuracy of the liquid crystal alignment pattern and the like, the single period Λ in the liquid crystal alignment pattern of the cholesteric liquid crystal layer is preferably 0.1 μm or more.

In the optical element 10 shown in FIG. 1, the selective reflection center wavelengths of all the cholesteric liquid crystal layers are different from each other, but the present invention is not limited thereto.

That is, the optical element according to the embodiment of the present invention may include cholesteric liquid crystal layers having the same (substantially the same) selective reflection center wavelength and different directions of circularly polarized light to be reflected (different senses of a helical structure).

For example, the optical element 10 shown in the drawing may further include at least one of a second R reflection cholesteric liquid crystal layer that has a selective reflection center wavelength in a red light wavelength range and reflects left circularly polarized light, a second G reflection cholesteric liquid crystal layer that has a selective reflection center wavelength in a green light wavelength range and reflects left circularly polarized light, or a second B reflection cholesteric liquid crystal layer that has a selective reflection center wavelength in a blue light wavelength range and reflects left circularly polarized light.

This way, by providing the cholesteric liquid crystal layers having the same selective reflection center wavelength and different directions of circularly polarized light to be reflected, a reflectivity of light of each of the colors can be improved.

Here, in the cholesteric liquid crystal layers having the same selective reflection center wavelength and different directions of circularly polarized light to be reflected, it is preferable that the rotation directions of the optical axes 30A of the liquid crystal compound 30 in the liquid crystal alignment pattern are different from each other.

For example, in a case where the rotation direction of the optical axis 30A of the liquid crystal compound 30 in the R reflection cholesteric liquid crystal layer 26R that reflects right circularly polarized light of red light is clockwise as shown in FIG. 3, it is preferable that the rotation direction of the optical axis 30A of the liquid crystal compound 30 in the second R reflection cholesteric liquid crystal layer that reflects left circularly polarized light of red light is counterclockwise.

In the cholesteric liquid crystal layers in which the optical axis 30A of the liquid crystal compound 30 continuously rotates in the arrow X direction (the in-plane direction), in a case where the directions of circularly polarized light are different from each other and the rotation directions of the optical axes 30A are the same, a reflection direction of circularly polarized light in the cholesteric liquid crystal layer that reflects right circularly polarized light is opposite to that in the cholesteric liquid crystal layer that reflects left circularly polarized light.

On the other hand, in the cholesteric liquid crystal layers having the same selective reflection center wavelength and different directions of circularly polarized light to be reflected, by setting the rotation directions of the optical axes 30A of the liquid crystal compound 30 in the liquid crystal alignment pattern to be opposite to each other, a reflection direction of circularly polarized light in the cholesteric liquid crystal layer that reflects right circularly polarized light can be made to be the same as that in the cholesteric liquid crystal layer that reflects left circularly polarized light.

In addition, this way, in a case where the optical element according to the embodiment of the present invention includes the cholesteric liquid crystal layers having the same selective reflection center wavelength and different directions of circularly polarized light to be reflected, it is preferable that the single periods Λ in the liquid crystal alignment patterns of the cholesteric liquid crystal layers having the same selective reflection center wavelength are the same.

Figure 2:
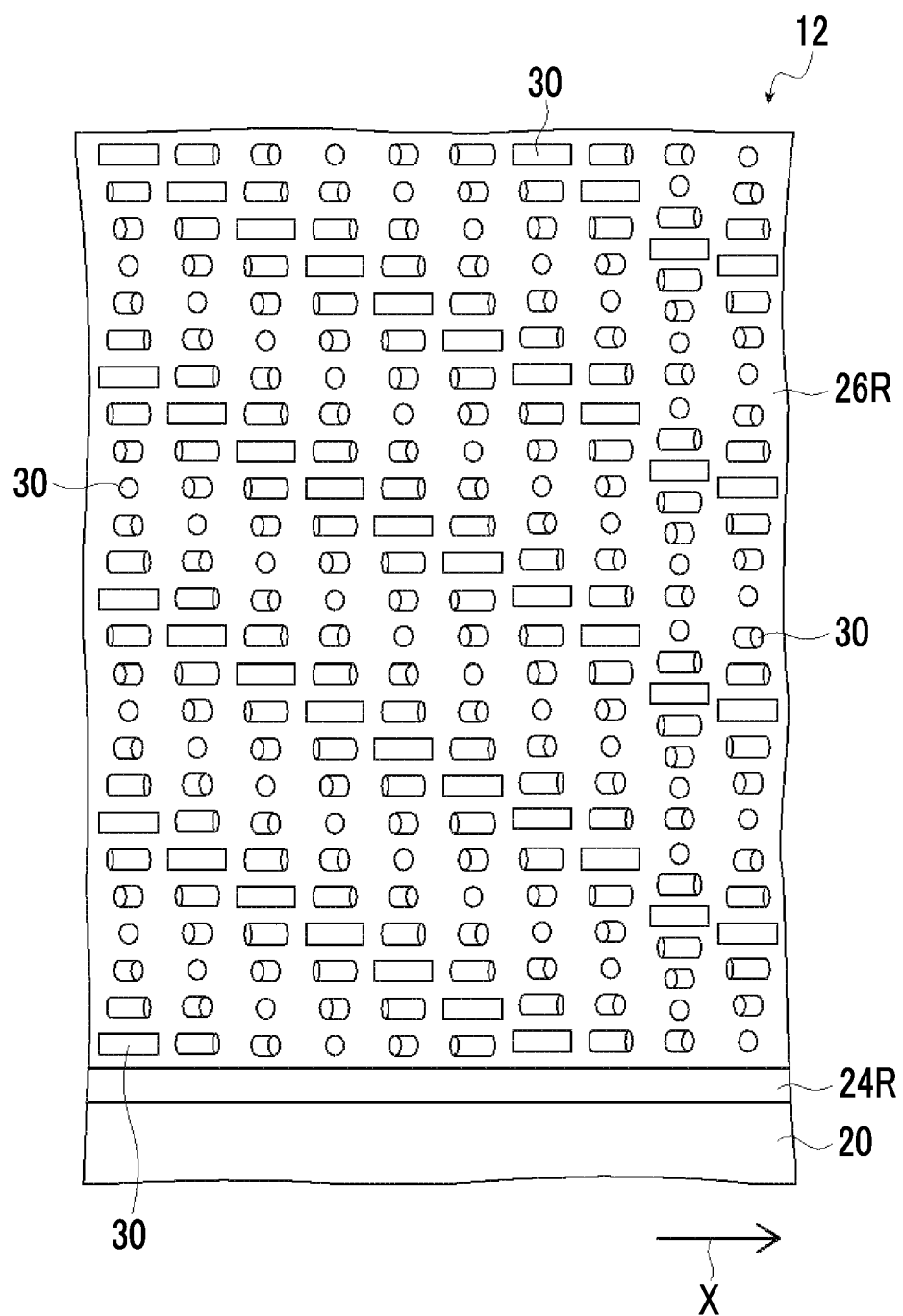
FIG. 2 is a conceptual diagram showing a cholesteric liquid crystal layer of the optical element shown in FIG. 1.

In the optical elements shown in FIGS. 1 to 3, the optical axis 30A of the liquid crystal compound 30 in the liquid crystal alignment pattern of the cholesteric liquid crystal layer continuously rotates only in the arrow X direction.

However, the present invention is not limited thereto, and various configurations can be used as long as the optical axis 30A of the liquid crystal compound 30 in the cholesteric liquid crystal layer continuously rotates in the in-plane direction.

Figure 6:
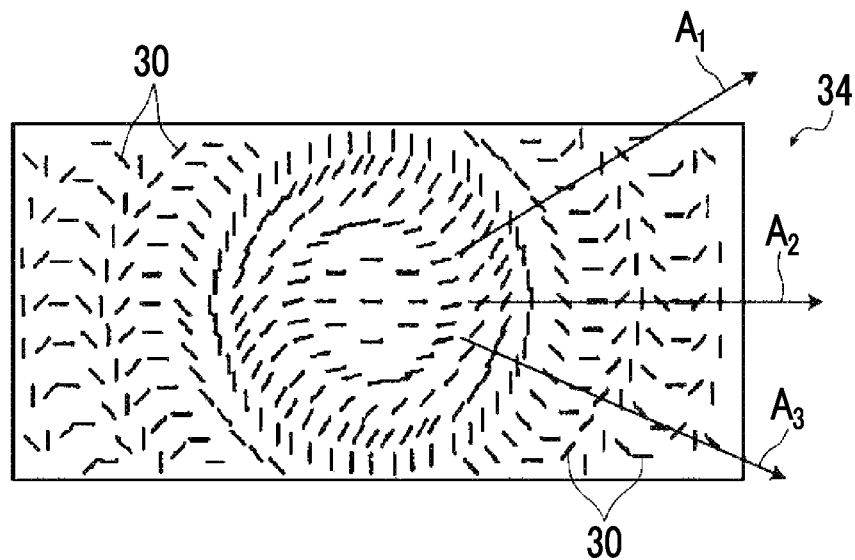
FIG. 6 is a plan view showing another example of the cholesteric liquid crystal layer of the optical element according to the present invention.

For example, a cholesteric liquid crystal layer 34 conceptually shown in a plan view of FIG. 6 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside.

Alternatively, a liquid crystal alignment pattern can also be used where the in-plane direction in which the direction of the optical axis of the liquid crystal compound 30 changes while continuously rotating is provided in a radial shape from the center of the cholesteric liquid crystal layer 34 instead of a concentric circular shape.

FIG. 6 shows only the liquid crystal compound 30 of the surface of the alignment film as in FIG. 3. However, as shown in FIG. 2, the cholesteric liquid crystal layer 34 has the helical structure in which the liquid crystal compound 30 on the surface of the alignment film is helically turned and rotated as described above.

Further, FIG. 6 shows only one cholesteric liquid crystal layer 34. However, as described above, the optical element according to the embodiment of the present invention includes a plurality of cholesteric liquid crystal layers having different selective reflection center wavelengths. Accordingly, even in a case where the optical element includes the cholesteric liquid crystal layer of the concentric circular liquid crystal alignment pattern, the optical element has the configuration in which the R reflection cholesteric liquid crystal layer that selectively reflects red light, the G reflection cholesteric liquid crystal layer that selectively reflects green light, the B reflection cholesteric liquid crystal layer that selectively reflects blue light, are laminated for example, as in the optical element shown in FIG. 1. In addition, as described above, a permutation of lengths of the selective reflection center wavelengths and a permutation of lengths of the single period Λ in the liquid crystal alignment patterns match each other in the plurality of cholesteric liquid crystal layers having different selective reflection center wavelengths.

In the cholesteric liquid crystal layer 34 shown in FIG. 6, the optical axis (not shown) of the liquid crystal compound 30 is a longitudinal direction of the liquid crystal compound 30.

In the cholesteric liquid crystal layer 34, the direction of the optical axis of the liquid crystal compound 30 changes while continuously rotating in a direction in which a large number of optical axes move to the outside from the center of the cholesteric liquid crystal layer 34, for example, a direction indicated by an arrow $A_1$, a direction indicated by an arrow $A_2$, a direction indicated by an arrow $A_3$, or . . . .

In addition, as a preferable aspect, for example, the direction of the optical axis of the liquid crystal compound changes while rotating in a radial direction from the center of the cholesteric liquid crystal layer 34 as shown in FIG. 6. In the aspect shown in FIG. 6, counterclockwise alignment is shown. The rotation directions of the optical axes indicated by the respective arrows A1, A2, and A3 in FIG. 6 are counterclockwise toward the outside from the center.

In circularly polarized light incident into the cholesteric liquid crystal layer 34 having the above-described liquid crystal alignment pattern, the absolute phase changes depending on individual local regions having different optical axes of the liquid crystal compound 30. At this time, the amount of change in absolute phase varies depending on the directions of the optical axes of the liquid crystal compound 30 into which circularly polarized light is incident.

This way, in the cholesteric liquid crystal layer 34 having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 30 and the direction of circularly polarized light to be reflected.

That is, by setting the liquid crystal alignment pattern of the cholesteric liquid crystal layer in a concentric circular shape, the optical element according to the embodiment of the present invention exhibits, for example, a function as a concave mirror or a convex mirror.

Here, in a case where the liquid crystal alignment pattern of the cholesteric liquid crystal layer is concentric circular such that the optical element functions as a concave mirror, it is preferable that the length of the single period Λ over which the optical axis rotates by 180° in the liquid crystal alignment pattern gradually decreases from the center of the cholesteric liquid crystal layer 34 toward the outer direction in the in-plane direction in which the optical axis continuously rotates.

As described above, the reflection angle of light with respect to an incidence direction increases as the length of the single period Λ in the liquid crystal alignment pattern decreases. Accordingly, the length of the single period Λ in the liquid crystal alignment pattern gradually decreases from the center of the cholesteric liquid crystal layer 34 toward the outer direction in the in-plane direction in which the optical axis continuously rotates. As a result, light can be further gathered, and the performance as a concave mirror can be improved.

In the present invention, in a case where the optical element functions as a convex mirror, it is preferable that the continuous rotation direction of the optical axis in the liquid crystal alignment pattern is reversed from the center of the cholesteric liquid crystal layer 34.

In addition, by gradually decreasing the length of the single period Λ over which the optical axis rotates by 180° from the center of the cholesteric liquid crystal layer 34 toward the outer direction in the in-plane direction in which the optical axis continuously rotates, light incident into the cholesteric liquid crystal layer can be further dispersed, and the performance as a convex mirror can be improved.

In the present invention, in a case where the optical element functions as a convex mirror, it is preferable that a direction of circularly polarized light to be reflected (sense of a helical structure) from the cholesteric liquid crystal layer is reversed to be opposite to that in the case of a concave mirror, that is, the helical turning direction of the cholesteric liquid crystal layer is reversed.

In addition, by gradually decreasing the length of the single period Λ over which the optical axis rotates by 180° from the center of the cholesteric liquid crystal layer 34 toward the outer direction in the in-plane direction in which the optical axis continuously rotates, light incident into the cholesteric liquid crystal layer can be further dispersed, and the performance as a convex mirror can be improved.

In a state where the helical turning direction of the cholesteric liquid crystal layer is reversed, it is preferable that the continuous rotation direction of the optical axis in the liquid crystal alignment pattern is reversed from the center of the cholesteric liquid crystal layer 34. As a result, the optical element can be made to function as a concave mirror.

In the present invention, in a case where the optical element is made to function as a convex mirror or a concave mirror, it is preferable that the optical element satisfies the following Expression (4).

$$\Phi=(r)=(\pi/\lambda)[(r^2+f^2)^{1/2}-f] \qquad \text{Expression (4)}$$

Here, r represents a distance from the center of a concentric circle and is represented by Expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents the selective reflection center wavelength of the cholesteric liquid crystal layer, and f represents a desired focal length.

In the present invention, depending on the uses of the optical element, conversely, the length of the single period Λ in the concentric circular liquid crystal alignment pattern may gradually increase from the center of the cholesteric liquid crystal layer 34 toward the outer direction in the in-plane direction in which the optical axis continuously rotates.

Further, depending on the uses of the optical element such as a case where it is desired to provide a light amount distribution in reflected light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: a cholesteric liquid crystal layer in which the single period Λ is uniform over the entire surface; and a cholesteric liquid crystal layer in which regions having different lengths of the single periods Λ are provided. This point is also applicable to a configuration in which the optical axis continuously rotates only in the in-plane direction.

Figure 7:
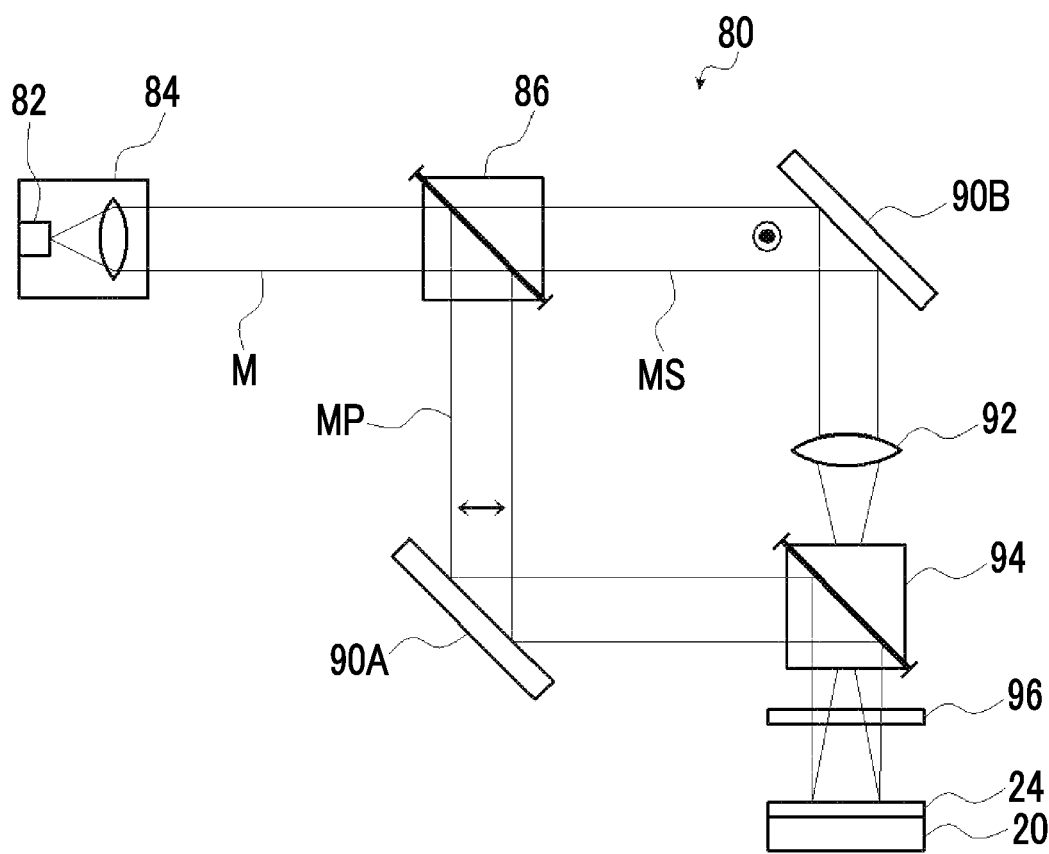
FIG. 7 is a conceptual diagram showing another example of the exposure device that exposes the alignment film of the optical element according to the present invention.

FIG. 7 conceptually shows an example of an exposure device that forms the concentric circular alignment pattern in the alignment film. Examples of the alignment film include the R alignment film 24R, the G alignment film 24G, and the B alignment film 24B.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the length Λ of the single period in the liquid crystal alignment pattern in which the optical axis of the liquid crystal compound 30 continuously rotates by 180° can be controlled by changing the refractive power of the lens 92 (the F number of the lens 92), the focal length of the lens 92, the distance between the lens 92 and the alignment film 14, and the like.

In addition, by adjusting the refractive power of the lens 92, the length Λ of the single period in the liquid crystal alignment pattern in the in-plane direction in which the optical axis continuously rotates can be changed. Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1 to 3 in which the optical axis 30A of the liquid crystal compound 30 continuously rotates only in the in-plane direction as the arrow X direction.

For example, by gradually decreasing the single period Λ of the liquid crystal alignment pattern in the arrow X direction, an optical element that reflects light to be gathered can be obtained.

In addition, by reversing the direction in which the optical axis in the liquid crystal alignment pattern rotates by 180°, an optical element that reflects light to be diffused only in the arrow X direction can be obtained. Likewise, by reversing the direction of circularly polarized light to be reflected (sense of a helical structure) from the cholesteric liquid crystal layer, an optical element that reflects light to be diffused only in the arrow X direction can be obtained. By reversing the direction in which the optical axis of the liquid crystal alignment pattern rotates by 180° in a state where the direction of circularly polarized light to be reflected from the cholesteric liquid crystal layer, an optical element that reflects light to be gathered can be obtained.

Further, depending on the uses of the optical element such as a case where it is desired to provide a light amount distribution in reflected light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be gathered can be used.

The optical element according to the embodiment of the present invention can be used for various uses where light is reflected at an angle other than the angle of specular reflection, for example, an optical path changing member, a light gathering element, a light diffusing element to a predetermined direction, a diffraction element, or the like in an optical device.

Figure 8:
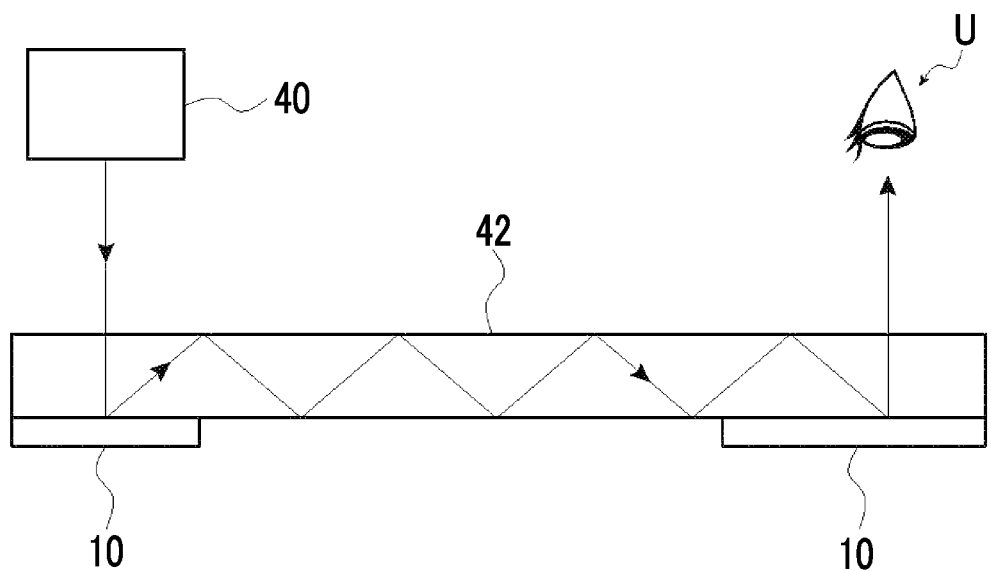
FIG. 8 is a conceptual diagram showing AR glasses including a light guide element according to the present invention including the optical element shown in FIG. 1.

In a preferable example, as conceptually shown in FIG. 8, two optical elements 10 according to the embodiment of the present invention are provided on a light guide plate 42 to be spaced from each other to configure a light guide element according to the embodiment of the present invention. In the light guide element according to the embodiment of the present invention, for example, the optical element according to the embodiment of the present invention is used as a diffraction element of the above-described AR glasses. As a result, light (projection image) emitted from a display 40 is guided to the light guide plate 42 at a sufficient angle for total reflection (at an angle of a critical angle or more) by one optical element 10, and the light propagated in the light guide plate 42 is reflected from the other optical element 10 at an angle corresponding to emission such that the light can be emitted from the light guide plate 42 to an observation position by a user U in the AR glasses.

That is, FIG. 8 shows an image display device according to the embodiment of the present invention including the display 40 (display element) and the light guide element according to the embodiment of the present invention.

As described above, in the optical element according to the embodiment of the present invention, the wavelength dependence of the reflection angle is small. Therefore, red light, green light, and blue light emitted from the display 40 can be reflected in the same direction. Therefore, with one light guide plate 42, even in a case where red image, green image, and blue image are propagated, a full color image having no color shift can be emitted from the light guide plate to the observation position by the user U in the AR glasses. Accordingly, in the light guide element according to the embodiment of the present invention including the optical element 10 according to the embodiment of the present invention, the light guide plate of the AR glasses can be made thin and light as a whole, and the configuration of the AR glasses can be simplified.

In addition, in the light guide element and the image display device according to the embodiment of the present invention including the optical element according to the embodiment of the present invention, a viewing angle (field of view (FOV)) can be widened during use in the AR glasses or the like.

In order to guide light incident into the light guide plate 42, it is necessary to reflect light at an angle more than a critical angle. As described above, in the cholesteric liquid crystal layer having the liquid crystal alignment pattern in which the optical axis 30A continuously rotates in the in-plane direction, by adjusting the single period Λ of the liquid crystal alignment pattern, the incidence angle of light emitted from the display 40 into the light guide plate can be adjusted. Therefore, light can be made to be incident into the light guide plate at the critical angle. Here, as described above, in the cholesteric liquid crystal layer having the above-described liquid crystal alignment pattern, the reflection angle varies depending on wavelengths. As the wavelength increases, light is reflected to be tilted at a large angle with respect to the incidence direction. Therefore, in a case where the single period Λ of the liquid crystal alignment pattern is set according to the critical angle, depending on the wavelength of light and the incidence angle of light into the light guide plate 42, the angle may be less than or equal to the critical angle such that a part of the light is not guided.

As a result, during use in AR glasses or the like, in the case of a full color image, a viewing angle common to red light, green light, and blue light is narrowed such that a viewing angle of a display image is narrowed.

On the other hand, in the light guide element and the image display device according to the embodiment of the present invention including the optical element 10 according to the embodiment of the present invention, a permutation of lengths of the selective reflection center wavelengths and a permutation of lengths of the single periods Λ in the liquid crystal alignment patterns match each other in the cholesteric liquid crystal layers of the optical element 10. As a result, the wavelength dependence of the reflection angle is reduced. As a result, according to the present invention, red light, green light, and blue light can be collectively guided. During use of AR glasses or the like, a viewing angle common to red light, green light, and blue light is widened such that a viewing angle of a display image can be widened.

The light guide element according to the embodiment of the present invention is not limited to the configuration in which two optical elements according to the embodiment of the present invention spaced from each other are provided in the light guide plate 42 as shown in FIG. 8. A configuration in which only one optical element according to the embodiment of the present invention is provided in the light guide plate for incidence or emission of light into or from the light guide plate 42.

In the image display device according to the embodiment of the present invention, the display 40 is not particularly limited. For example, various well-known displays used in AR glasses or the like can be used.

Examples of the display include a liquid crystal display, an organic electroluminescence display, and a digital light processing (DLP). Examples of the liquid crystal display include a liquid crystal on silicon (LCOS).

The display 40 may display a two-color image or may display a full color image of red, green, and blue. According to the present invention, even a polychromic image such as a full color image can be suitably handled as described above.

In addition, the light guide plate 42 is also not particularly limited, and various light guide plates such as a light guide plate used in AR glasses, an edge light mode liquid crystal display can be used.

In a case where these optical elements (for example, a liquid crystal diffraction grating and a tilted cholesteric specular reflection element) are used, it is preferable that light emitted from the display 40 is converted into circularly polarized light. That is in the image display device according to the embodiment of the present invention, it is preferable that the display element emits circularly polarized light to the optical element 10 according to the embodiment of the present invention. By converting the light emitted from the display 40 into circularly polarized light, the diffraction efficiency or the reflection efficiency can be improved.

In a case where the light emitted from the display 40 is unpolarized light, the conversion of light emitted from the display 40 into circularly polarized light may be performed by emitting light from the display 40 through a linear polarizer and a λ/4 plate. In addition, in a case where the light emitted from the display 40 is linearly polarized light, the conversion of light emitted from the display 40 into circularly polarized light may be performed by emitting light from the display 40 through a λ/4 plate.

At this time Re(550) of the λ/4 plate is preferably 100 to 180 nm, more preferably 110 to 170 nm, and still more preferably 120 to 160 nm.

Re(λ) represents an in-plane retardation at a wavelength λ, and Rth(λ) represents a thickness-direction retardation at a wavelength λ. Specifically, Re(λ) and Rth(λ) are values defined by the following expressions. λ in the parentheses represents a measurement wavelength [nm]. For example, a value measured using an Axometry (manufactured by Axometric) can be used.

$$Re(\lambda) = (nx - ny) \times d$$

$$Rth(\lambda) = ((nx + ny)/2 - nz) \times d$$

In the expression, nx represents a refractive index in a slow axis direction, ny represents a refractive index in a fast axis direction, nz represents a refractive index in a thickness direction, and d represents a thickness [nm].

In addition, in consideration of incidence of light emitted from the display 40 in an oblique direction with respect to the normal direction of the λ/4 plate for conversion into circularly polarized light, Rth(λ) of the λ/4 plate for conversion of light emitted from the display 40 into circularly polarized light is preferably −70 to 70 nm, more preferably −50 to 50 nm, and still more preferably −30 to 30 nm.

Unlike the λ/4 plate used for forming the alignment film, the λ/4 plate for conversion of light emitted from the display 40 into circularly polarized light is actually seen by a person. Therefore, it is also preferable to consider a tint.

In order to secure the uniformity of the tint, the wavelength dispersion of the λ/4 plate for conversion of light emitted from the display 40 into circularly polarized light is preferably reverse dispersion. Specifically, in a range of 450 to 550 nm, a value of a ratio between Re(λ) at the following respective wavelengths is preferably 0.74≤Re(450)/Re(550)≤0.91,
more preferably 0.75≤Re(450)/Re(550)≤0.89, and
still more preferably 0.78≤Re(450)/Re(550)≤0.87.

In addition, a value of a ratio between Rth(λ) at the following respective wavelengths is
preferably 0.74≤Rth(450)/Rth(550)≤0.91,
more preferably 0.75≤Rth(450)/Rth(550)≤0.89, and
still more preferably 0.78≤Rth(450)/Rth(550)≤0.87.

Further, in a range of 550 to 650 nm, a value of a ratio between Re(2) at the following respective wavelengths is
preferably 0.102≤Re(650)/Re(550)≤0.126,
more preferably 0.106≤Re(650)/Re(550)≤0.123, and
still more preferably 0.112≤Re(650)/Re(550)≤0.120.

In addition, a value of a ratio between Rth(λ) at the following respective wavelengths is
preferably 0.102≤Rth(650)/Rth(550)≤0.126,
more preferably 0.106≤Rth(650)/Rth(550)≤0.123, and
still more preferably 0.112≤Rth(650)/Rth(550)≤0.120.

In addition, the light guide element according to the embodiment of the present invention may include three or more optical elements according to the embodiment of the present invention.

Figure 9:
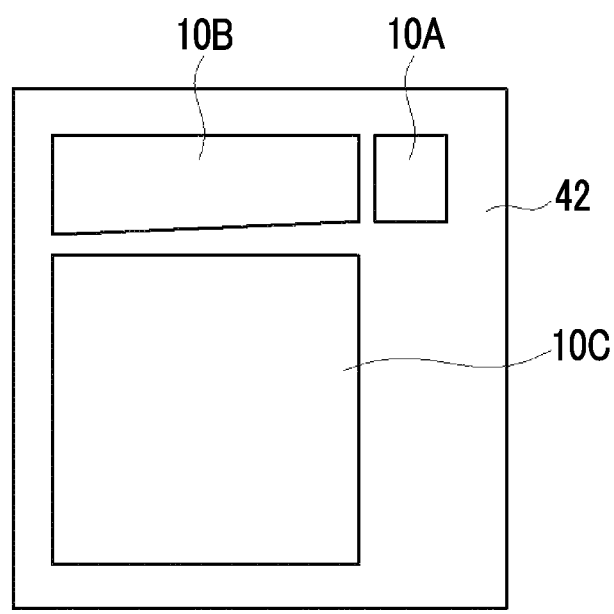
FIG. 9 is a diagram conceptually showing another example of the light guide element according to the present invention including the optical element shown in FIG. 1.

For example, a light guide element (image display device) shown in FIG. 9 can be used. In the light guide element shown in FIG. 9, as diffraction elements, three optical elements according to the embodiment of the present invention including a first optical element 10A, a second optical element 10B, and a third optical element 10C are provided in the light guide plate 42 to be spaced from each other.

FIG. 9 is a view in a case where the light guide element is seen from a mounting circle side of the optical element in a direction perpendicular to a main surface of the light guide plate 42. The main surface is the maximum surface of a sheet-shaped material (a film or a plate-shaped material).

Basically, the first optical element 10A, the second optical element 10B, and the third optical element 10C have the same configuration as that of the above-described optical element 10, except for the in-plane direction in which the optical axis 30A continuously rotates, that is, the arrow X direction.

In the light guide element shown in FIG. 9, an image of the display 40 not shown in the drawing is emitted to the first optical element 10A. The first optical element 10A reflects incident light to be tilted with respect to an incidence direction and is incident into the light guide plate 42 at a sufficient angle for total reflection (at an angle of a critical angle or more).

Here, the first optical element 10A reflects light to the second optical element 10B. The light that is allowed to be incident into the light guide plate 42 by the first optical element 10A propagates toward the second optical element 10B. The second optical element 10B also reflects the incident light to the third optical element 10C to be tilted with respect to an incidence direction.

Further, the third optical element 10C also reflects the incident light to be tilted with respect to an incidence direction such that the light is emitted from the light guide plate 42 at a critical angle or less and is provided for observing an image by the user U (not shown).

This way, by providing three or more optical elements according to the embodiment of the present invention in the light guide plate such that the first optical element 10A that is a diffraction element as an incidence portion allows light incident into the light guide plate 42 to propagate in the third optical element 10C that is a diffraction element an emission portion through the second optical element 10B that is an intermediate diffraction element, an angle range of light emitted to the user U, that is, an observation area can be widened, and a viewing angle can be widened.

This way, in the light guide element including the first optical element 10A, the second optical element 10B, and the third optical element 10C, the single period Λ of the liquid crystal alignment pattern in each of the optical elements is not particularly limited. That is, regarding the single period Λ of the liquid crystal alignment pattern in each of the optical elements, the single period Λ of the liquid crystal alignment pattern for obtaining a reflection angle at which light can be propagated from the first optical element 10A to the third optical element 10C may be appropriately set depending on the position, shape, and the like of each of the optical elements.

Here, in the first optical element 10A, the second optical element 10B, and the third optical element 10C, in a case where the cholesteric liquid crystal layers corresponding to light having the longest wavelength, that is, the R reflection cholesteric liquid crystal layers 26R in the example shown in the drawing are compared to each other, it is preferable that the single period Λ of the liquid crystal alignment pattern of the second optical element 10B is the shortest. That is, in a case where the single period Λ of the R reflection cholesteric liquid crystal layer 26R in the first optical element 10A is represented by Λ1, the single period Λ of the R reflection cholesteric liquid crystal layer 26R in the second optical element 10B is represented by Λ2, and the single period Λ of the R reflection cholesteric liquid crystal layer 26R in the third optical element 10C is represented by Λ3, it is preferable that "Λ2<Λ1" and "Λ2<Λ3" are satisfied.

In other words, it is preferable that the single period of the liquid crystal alignment pattern in the second diffraction element 10B that is an intermediate diffraction element is shorter than those in the first optical element 10A that is a diffraction element as an incidence portion of light into the light guide plate 42 and the third diffraction element 10C that is an emission portion of light from the light guide plate 42 such that light is reflected to be tilted at a large angle with respect to a light incidence direction.

The above-described configuration is preferable because light can be more appropriately propagated from the first optical element 10A to the third optical element 10C, and light can be appropriately emitted from the light guide plate to the user U.

The above-described light guide element (image display device) according to the embodiment of the present invention includes one light guide plate as a preferable aspect, but the present invention is not limited thereto.

That is, the light guide element according to the embodiment of the present invention may include, for example, a light guide plate for a red image and a blue image and a light guide plate for a green image. Alternatively, as in the AR glasses in the related art, the light guide element according to the embodiment of the present invention may include three light guide plates including a light guide plate for a red image, a light guide plate for a green image, and a light guide plate for a blue image.

In addition, in a case where a plurality of light guide plates are used and are laminated, the same effects can be obtained even in a case where the optical elements disposed in the respective light guide plates are not on the same plane in a view from a light guide plate main surface direction.

In the above-described example, the optical element according to the embodiment of the present invention is used as the optical element that includes the three cholesteric liquid crystal layers and reflects three light components including red light, green light, and blue light. However, the present invention is not limited to this example, and various configurations can be used.

For example, the optical element according to the embodiment of the present invention also may be configured to include three cholesteric liquid crystal layers having different selective reflection center wavelengths and to reflect not only light of one color or two or more colors selected from visible light such as red light, green light, or blue light but also infrared light and/or ultraviolet light or to reflect only light other than visible light. Alternatively, the optical element according to the embodiment of the present invention also may be configured to include four, five, or six cholesteric liquid crystal layers having different selective reflection center wavelengths and to reflect not only red light, green light, and blue light but also infrared light and/or ultraviolet light or to reflect only light other than visible light. Alternatively, the optical element according to the embodiment of the present invention also may be configured to include two cholesteric liquid crystal layers having different selective reflection center wavelengths and to reflect not only light of one color selected from visible light such as red light, green light, or blue light but also infrared light and/or ultraviolet light or to reflect only light other than visible light.

Hereinabove, the optical element, the light guide element, and the image display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of B Reflecting Layer>

(Support and Saponification Treatment of Support)

As the support, a commercially available triacetyl cellulose film (manufactured by Fuji Film Co., Ltd., Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam infrared electric heater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

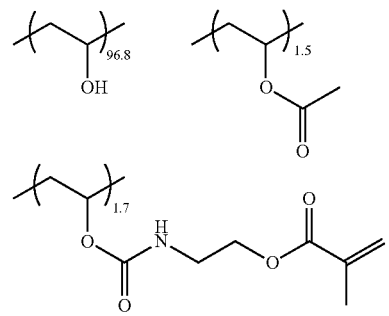

Modified Polyvinyl Alcohol (Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

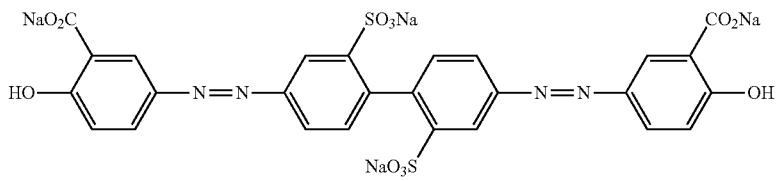

(Exposure of Alignment Film)

The alignment film was exposed using the exposure device shown in FIG. 5 to form an alignment film P-1 having an alignment pattern.

In the exposure device, a laser that emits laser light having a wavelength (325 nm) was used as the laser. The exposure dose of the interference light was 100 mJ/cm². The single period (the length over which the optical axis rotates by 180°) of an alignment pattern formed by two laser beams and interference thereof was controlled by changing an intersection angle (intersection angle α) between the two beams.

(Formation of B Reflection Cholesteric Liquid Crystal Layer)

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that has a selective reflection center wavelength of 450 nm and reflects right circularly polarized light.

Composition A-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 6.77 parts by mass |
| Leveling agent T-1 | 0.08 parts by mass |
| Methyl ethyl ketone | 268.20 parts by mass |

Rod-Shaped Liquid Crystal Compound L-1

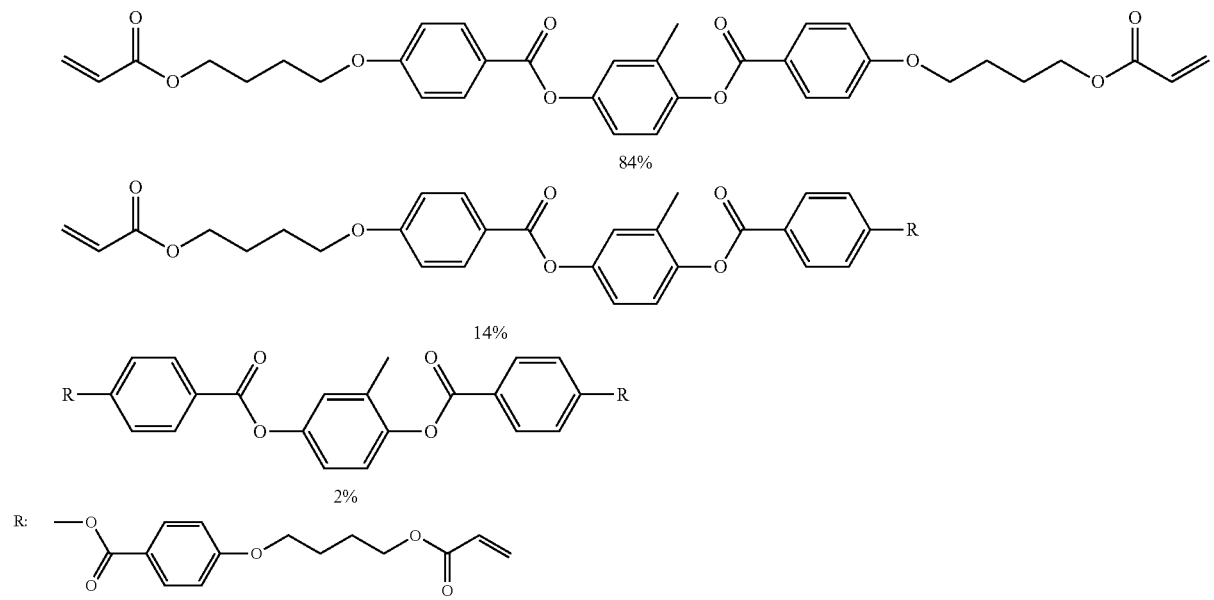

Chiral Agent Ch-1

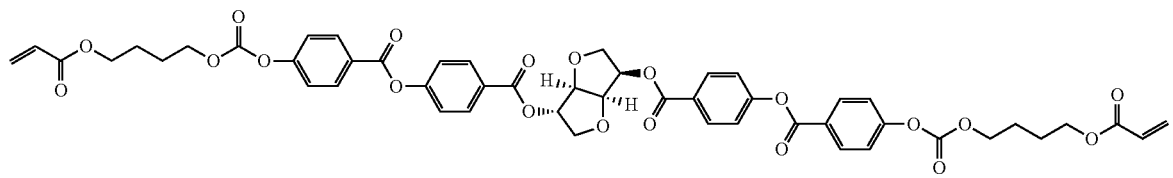 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Leveling Agent T-1

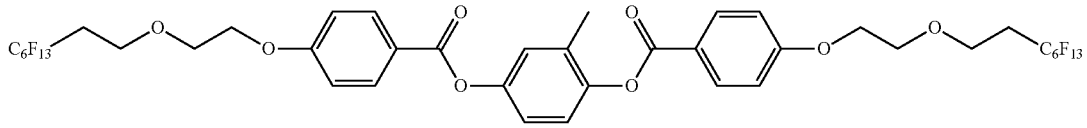

The B reflection cholesteric liquid crystal layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a B reflection cholesteric liquid crystal layer was obtained, and a B reflecting layer was prepared. In a case where a cross-section of a coating layer was observed with a scanning electron microscope (SEM), the cholesteric liquid crystalline phase of the B reflecting layer had 8 pitches.

It was verified using a polarizing microscope that the B reflection cholesteric liquid crystal layer had a periodically aligned surface as shown in FIG. 3. In the liquid crystal alignment pattern of the B reflection cholesteric liquid crystal layer, the single period over which the optical axis derived from the liquid crystal compound rotated by 180° was 2.6 µm.

<Preparation of G Reflecting Layer>

An alignment film P-2 having an alignment pattern was formed using the same method as that of the alignment film P-1, except that, in a case where the alignment film was exposed using the exposure device shown in FIG. 5, the intersection angle between two light components was changed.

In addition, a composition A-2 forming the cholesteric liquid crystal layer was prepared using the same method as that of the composition A-1, except that the addition amount of the chiral agent Ch-1 was changed to 5.68 parts by mass. This composition A-2 is a liquid crystal composition forming a cholesteric liquid crystal layer that has a selective reflection center wavelength of 530 nm and reflects right circularly polarized light.

A G reflection cholesteric liquid crystal layer was formed using the same method as that of B reflection cholesteric liquid crystal layer, except that multiple layers of the composition A-2 were applied to the alignment film P-2. Using this G reflection cholesteric liquid crystal layer, a G reflecting layer was prepared.

It was verified using a polarizing microscope that the G reflection cholesteric liquid crystal layer had a periodically aligned surface as shown in FIG. 3. In the liquid crystal alignment pattern of the G reflection cholesteric liquid crystal layer, the single period over which the optical axis derived from the liquid crystal compound rotated by 180° was 3.1 µm.

<Preparation of R Reflecting Layer>

An alignment film P-3 having an alignment pattern was formed using the same method as that of the alignment film P-1, except that, in a case where the alignment film was exposed using the exposure device shown in FIG. 5, the intersection angle between two light components was changed.

In addition, a composition A-3 forming the cholesteric liquid crystal layer was prepared using the same method as that of the composition A-1, except that the addition amount of the chiral agent Ch-1 was changed to 4.69 parts by mass. This composition A-3 is a liquid crystal composition forming a cholesteric liquid crystal layer that has a selective reflection center wavelength of 635 nm and reflects right circularly polarized light.

An R reflection cholesteric liquid crystal layer was formed using the same method as that of B reflection cholesteric liquid crystal layer, except that multiple layers of the composition A-3 were applied to the alignment film P-3. Using this R reflection cholesteric liquid crystal layer, an R reflecting layer was prepared.

It was verified using a polarizing microscope that the R reflection cholesteric liquid crystal layer had a periodically aligned surface as shown in FIG. 3. In the liquid crystal alignment pattern of the R reflection cholesteric liquid crystal layer, the single period over which the optical axis derived from the liquid crystal compound rotated by 180° was 3.7 µm.

<Preparation of Optical Element>

The B reflecting layer, the G reflecting layer, and the R reflecting layer prepared were bonded to each other using an adhesive (manufactured by Soken Chemical & Engineering Co., Ltd., SK DINE 2057) in order of the R reflecting layer, the G reflecting layer, and the B reflecting layer as in the optical element shown in FIG. 1. As a result, an optical element was prepared. During bonding, the following layer was bonded after peeling the support and the alignment film.

Example 2

A B reflecting layer, a G reflecting layer, and a R reflecting layer were prepared using the same method as that of Example 1, in a case where the alignment film was exposed using the exposure device shown in FIG. 5, the intersection angle between two light components was changed.

The following was verified using the same method as that of Example 1. In the liquid crystal alignment pattern of the B reflection cholesteric liquid crystal layer, the single period over which the optical axis derived from the liquid crystal compound rotated by 180° was 0.9 µm.

In the liquid crystal alignment pattern of the G reflection cholesteric liquid crystal layer, the single period over which the optical axis derived from the liquid crystal compound rotated by 180° was 1.1 µm.

In the liquid crystal alignment pattern of the R reflection cholesteric liquid crystal layer, the single period over which the optical axis derived from the liquid crystal compound rotated by 180° is 1.3 µm.

Using the B reflecting layer, the G reflecting layer, and the R reflecting layer, an optical element was prepared with the same method as that of Example 1.

Example 3

<Preparation of B Reflecting Layer>

An alignment film P-4 having an alignment pattern was formed using the same method as that of the alignment film P-1, except that, in a case where the alignment film was exposed using the exposure device shown in FIG. 5, the intersection angle between two light components was changed.

As the liquid crystal composition forming the cholesteric liquid crystal layer, the following composition B-1 was prepared. This composition B-1 is a liquid crystal composition forming a cholesteric liquid crystal layer that has a selective reflection center wavelength of 450 nm and reflects right circularly polarized light.

Composition B-1

| | |
|---|---|
| Liquid crystal compound L-2 | 80.00 parts by mass |
| Liquid crystal compound L-3 | 20.00 parts by mass |
| Polymerization initiator (IRGACURE (registered trade name) 907, manufactured by BASF SE) | 5.00 parts by mass |
| Chiral agent Ch-2 | 5.06 parts by mass |
| MEGAFACE F444 (manufactured by DIC Corporation) | 0.50 parts by mass |
| Methyl ethyl ketone | 255.00 parts by mass |

Liquid Crystal Compound L-2

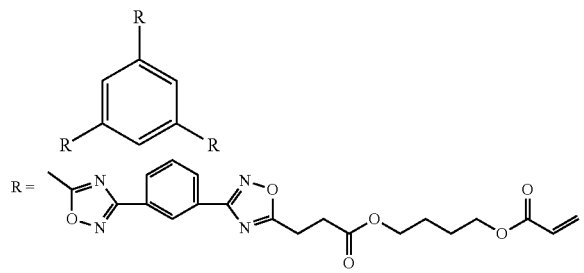

Liquid Crystal Compound L-3

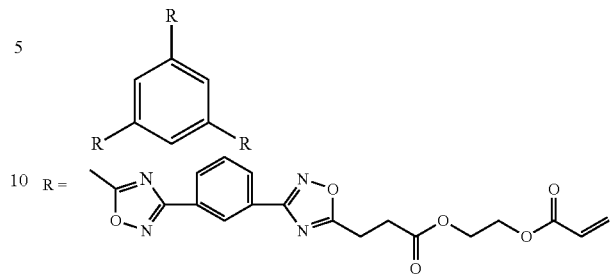

—Chiral Agent Ch-2—

A B reflection cholesteric liquid crystal layer was formed using the same method as that of B reflection cholesteric liquid crystal layer according to Example 1, except that multiple layers of the composition B-1 were applied to the alignment film P-4. Using this B reflection cholesteric liquid crystal layer, a B reflecting layer was prepared.

It was verified using a polarizing microscope that the R reflection cholesteric liquid crystal layer had a periodically aligned surface as shown in FIG. 3. In the liquid crystal alignment pattern of the B reflection cholesteric liquid crystal layer, the single period over which the optical axis derived from the liquid crystal compound rotated by 180° was 0.9 µm.

<Preparation of G Reflecting Layer>

An alignment film P-5 having an alignment pattern was formed using the same method as that of the alignment film P-1, except that, in a case where the alignment film was exposed using the exposure device shown in FIG. 5, the intersection angle between two light, components was changed.

In addition, a composition B-2 forming the cholesteric liquid crystal layer was prepared using the same method as that of the composition B-1, except that the addition amount of the chiral agent Ch-2 was changed to 4.25 parts by mass. This composition B-2 is a liquid crystal composition forming a cholesteric liquid crystal layer that has a selective reflection center wavelength of 530 nm and reflects right circularly polarized light.

A G reflection cholesteric liquid crystal layer was formed using the same method as that of B reflection cholesteric liquid crystal layer according to Example 1, except that multiple layers of the composition B-2 were applied to the alignment film P-5. Using this G reflection cholesteric liquid crystal layer, a G reflecting layer was prepared.

It was verified using a polarizing microscope that the G reflection cholesteric liquid crystal layer had a periodically aligned surface as shown in FIG. 3. In the liquid crystal alignment pattern of the G reflection cholesteric liquid crystal layer, the single period over which the optical axis derived from the liquid crystal compound rotated by 180° was 1.1 μm.

<Preparation of R Reflecting Layer>

An alignment film P-6 having an alignment pattern was formed using the same method as that of the alignment film P-1, except that, in a case where the alignment film was exposed using the exposure device shown in FIG. 5, the intersection angle between two light components was changed.

In addition, a composition B-3 forming the cholesteric liquid crystal layer was prepared using the same method as that of the composition B-1, except that the addition amount of the chiral agent Ch-2 was changed to 3.55 parts by mass. This composition B-3 is a liquid crystal composition forming a cholesteric liquid crystal layer that has a selective reflection center wavelength of 635 nm and reflects right circularly polarized light.

An R reflection cholesteric liquid crystal layer was formed using the same method as that of B reflection cholesteric liquid crystal layer according to Example 1, except that multiple layers of the composition B-3 were applied to the alignment film P-6. Using this R reflection cholesteric liquid crystal layer, an R reflecting layer was prepared.

It was verified using a polarizing microscope that the R reflection cholesteric liquid crystal layer had a periodically aligned surface as shown in FIG. 3. In the liquid crystal alignment pattern of the R reflection cholesteric liquid crystal layer, the single period over which the optical axis derived from the liquid crystal compound rotated by 180° was 1.3 μm.

<Preparation of Optical Element>

Using the B reflecting layer, the G reflecting layer, and the R reflecting layer, an optical element was prepared with the same method as that of Example 1.

Comparative Example 1

A B reflecting layer, a G reflecting layer, and a R reflecting layer were prepared using the same method as that of Example 1, in a case where the alignment film was exposed using the exposure device shown in FIG. 5, the intersection angle between two light components was changed. Using the B reflecting layer, the G reflecting layer, and the R reflecting layer, an optical element was prepared.

In this example, in a case where the alignment film was exposed, the intersection angle between two light components was uniform in all of the B reflecting layer, the G reflecting layer, and the R reflecting layer.

In all the liquid crystal alignment patterns of the formed cholesteric liquid crystal layers, the single period over which the optical axis derived from the liquid crystal compound rotated by 180° was 3.1 μm.

Comparative Example 2

A B reflecting layer, a G reflecting layer, and a R reflecting layer were prepared using the same method as that of Example 2, in a case where the alignment film was exposed using the exposure device shown in FIG. 5, the intersection angle between two light components was changed. Using the B reflecting layer, the G reflecting layer, and the R reflecting layer, an optical element was prepared.

In this example, in a case where the alignment film was exposed, the intersection angle between two light components was uniform in all of the B reflecting layer, the G reflecting layer, and the R reflecting layer.

In all the liquid crystal alignment patterns of the formed cholesteric liquid crystal layers, the single period over which the optical axis derived from the liquid crystal compound rotated by 180° was 1.1 μm.

Comparative Example 3

A B reflecting layer, a G reflecting layer, and a R reflecting layer were prepared using the same method as that of Example 3, in a case where the alignment film was exposed using the exposure device shown in FIG. 5, the intersection angle between two light components was changed. Using the B reflecting layer, the G reflecting layer, and the R reflecting layer, an optical element was prepared.

In this example, in a case where the alignment film was exposed, the intersection angle between two light components was uniform in all of the B reflecting layer, the G reflecting layer, and the R reflecting layer.

In all the liquid crystal alignment patterns of the formed cholesteric liquid crystal layers, the single period over which the optical axis derived from the liquid crystal compound rotated by 180° was 1.1 μm.

Example 4

<Preparation of B Reflecting Layer>

An alignment film P-7 was formed using the same method as that of the alignment film P-1, except that the exposure device shown in FIG. 7 was used as the exposure device for exposing the alignment film. By using the exposure device shown in FIG. 7, the single period of the alignment pattern gradually decreased toward the outer direction.

A B reflection cholesteric liquid crystal layer was formed using the same method as that of B reflection cholesteric liquid crystal layer according to Example 1, except that multiple layers of the composition A-1 were applied to the alignment film P-7. Using this B reflection cholesteric liquid crystal layer, a B reflecting layer was prepared.

It was verified using a polarizing microscope that the R reflection cholesteric liquid crystal layer had a periodically aligned surface having a concentric circular shape (radial shape) as shown in FIG. 6. In the liquid crystal alignment pattern of the B reflection cholesteric liquid crystal layer, regarding the single period over which the optical axis derived from the liquid crystal compound rotated by 180°, the single period of a center portion was 300 μm, the single period of a portion at a distance of 2.5 mm from the center was 9.0 μm, the single period of a portion at a distance of 5.0 mm from the center was 4.5 μm. This way, the single period decreased toward the outer direction.

Table 1 shows the single period of the portion at a distance of 5.0 mm from the center. Regarding this point, the same is applied to the G reflecting layer and the R reflecting layer.

<Preparation of G Reflecting Layer>

An alignment film P-8 was formed using the same method as that of the alignment film P-7, except that the focal length of the lens and the distance between the lens and the alignment film in the exposure device shown in FIG. 7 were changed.

A G reflection cholesteric liquid crystal layer was formed using the same method as that of B reflection cholesteric liquid crystal layer according to Example 1, except that multiple layers of the composition A-2 were applied to the alignment film P-8. Using this G reflection cholesteric liquid crystal layer, a G reflecting layer was prepared.

It was verified using a polarizing microscope that the R reflection cholesteric liquid crystal layer had a periodically aligned surface having a concentric circular shape (radial shape) as shown in FIG. 6. In the liquid crystal alignment pattern of the R reflection cholesteric liquid crystal layer, regarding the single period over which the optical axis derived from the liquid crystal compound rotated by 180°, the single period of a center portion was 326 µm, the single period of a portion at a distance of 2.5 mm from the center was 10.6 µm, the single period of a portion at a distance of 5.0 mm from the center was 5.3 µm. This way, the single period decreased toward the outer direction.

<Preparation of R Reflecting Layer>

An alignment film P-9 was formed using the same method as that of the alignment film P-7, except that the focal length of the lens and the distance between the lens and the alignment film in the exposure device shown in FIG. 7 were changed.

An R reflection cholesteric liquid crystal layer was formed using the same method as that of B reflection cholesteric liquid crystal layer according to Example 1, except that multiple layers of the composition A-3 were applied to the alignment film P-9. Using this R reflection cholesteric liquid crystal layer, an R reflecting layer was prepared.

It was verified using a polarizing microscope that the R reflection cholesteric liquid crystal layer had a periodically aligned surface having a concentric circular shape (radial shape) as shown in FIG. 6. In the liquid crystal alignment pattern of the R reflection cholesteric liquid crystal layer, regarding the single period over which the optical axis derived from the liquid crystal compound rotated by 180°, the single period of a center portion was 356 µm, the single period of a portion at a distance of 2.5 mm from the center was 12.7 µm, the single period of a portion at a distance of 5.0 mm from the center was 6.4 µm. This way, the single period decreased toward the outer direction.

<Preparation of Optical Element>

Using the B reflecting layer, the G reflecting layer, and the R reflecting layer, an optical element was prepared with the same method as that of Example 1.

Comparative Example 4

A B reflecting layer, a G reflecting layer, and a R reflecting layer were prepared using the same method as that of Example 4, in a case where the alignment film was exposed using the exposure device shown in FIG. 7, the focal length of the lens and the distance between the lens and the alignment film were changed. Using the B reflecting layer, the G reflecting layer, and the R reflecting layer, an optical element was prepared.

In this example, the focal length of the lens in the exposure device was uniform in all of the B reflecting layer, the G reflecting layer, and the R reflecting layer.

In the liquid crystal alignment pattern of the formed cholesteric liquid crystal layer, regarding the single period over which the optical axis derived from the liquid crystal compound rotated by 180°, the single period of a center portion was 326 µm, the single period of a portion at a distance of 2.5 mm from the center was 10.6 µm, the single period of a portion at a distance of 5.0 mm from the center was 5.3 µm. This way, the single period decreased toward the outer direction.

Example 5

A B reflecting layer, a G reflecting layer, and a R reflecting layer were prepared using the same method as that of Example 1, in a case where the alignment film was exposed using the exposure device shown in FIG. 5, the intersection angle between two light components was changed.

The following was verified using the same method as that of Example 1. In the liquid crystal alignment pattern of the B reflection cholesteric liquid crystal layer, the single period over which the optical axis derived from the liquid crystal compound rotated by 180° was 2.7 µm.

In the liquid crystal alignment pattern of the G reflection cholesteric liquid crystal layer, the single period over which the optical axis derived from the liquid crystal compound rotated by 180° was 3.1 µm.

In the liquid crystal alignment pattern of the R reflection cholesteric liquid crystal layer, the single period over which the optical axis derived from the liquid crystal compound rotated by 180° is 3.5 µm.

Using the B reflecting layer, the G reflecting layer, and the R reflecting layer, an optical element was prepared with the same method as that of Example 1.

Example 6

A B reflecting layer, a G reflecting layer, and a R reflecting layer were prepared using the same method as that of Example 1, in a case where the alignment film was exposed using the exposure device shown in FIG. 5, the intersection angle between two light components was changed.

The following was verified using the same method as that of Example 1. In the liquid crystal alignment pattern of the B reflection cholesteric liquid crystal layer, the single period over which the optical axis derived from the liquid crystal compound rotated by 180° was 2.8 µm.

In the liquid crystal alignment pattern of the G reflection cholesteric liquid crystal layer, the single period over which the optical axis derived from the liquid crystal compound rotated by 180° was 3.1 µm.

In the liquid crystal alignment pattern of the R reflection cholesteric liquid crystal layer, the single period over which the optical axis derived from the liquid crystal compound rotated by 180° is 3.3 µm.

Using the B reflecting layer, the G reflecting layer, and the R reflecting layer, an optical element was prepared with the same method as that of Example 1.

Example 7

A B reflecting layer, a G reflecting layer, and a R reflecting layer were prepared using the same method as that of Example 1, in a case where the alignment film was exposed using the exposure device shown in FIG. 5, the intersection angle between two light components was changed.

The following was verified using the same method as that of Example 1. In the liquid crystal alignment pattern of the B reflection cholesteric liquid crystal layer, the single period over which the optical axis derived from the liquid crystal compound rotated by 180° was 2.9 µm.

In the liquid crystal alignment pattern of the G reflection cholesteric liquid crystal layer, the single period over which the optical axis derived from the liquid crystal compound rotated by 180° was 3.1 µm.

In the liquid crystal alignment pattern of the R reflection cholesteric liquid crystal layer, the single period over which the optical axis derived from the liquid crystal compound rotated by 180° is 3.2 µm.

Using the B reflecting layer, the G reflecting layer, and the R reflecting layer, an optical element was prepared with the same method as that of Example 1.

Example 8

A B reflecting layer, a G reflecting layer, and a R reflecting layer were prepared using the same method as that of Example 1, in a case where the alignment film was exposed using the exposure device shown in FIG. 5, the intersection angle between two light components was changed.

The following was verified using the same method as that of Example 1. In the liquid crystal alignment pattern of the B reflection cholesteric liquid crystal layer, the single period over which the optical axis derived from the liquid crystal compound rotated by 180° was 1.0 µm.

In the liquid crystal alignment pattern of the G reflection cholesteric liquid crystal layer, the single period over which the optical axis derived from the liquid crystal compound rotated by 180° was 1.1 µm.

In the liquid crystal alignment pattern of the R reflection cholesteric liquid crystal layer, the single period over which the optical axis derived from the liquid crystal compound rotated by 180° is 1.2 µm.

Using the B reflecting layer, the G reflecting layer, and the R reflecting layer, an optical element was prepared with the same method as that of Example 1.

Example 9

(Formation of Alignment Film)

The alignment film-forming coating solution according to Example 1 was applied to a glass substrate by spin coating. The support on which the coating film of the alignment film-forming coating solution was formed was dried using a hot plate at 60° C. for 60 seconds. As a result, an alignment film was formed.

(Exposure of Alignment Film)

The exposure of the alignment film was performed using the same method as that of Example 1, in a case where the alignment film was exposed using the exposure device shown in FIG. 5, the exposure dose was changed to 300 mJ/cm$^2$ and the intersection angle between two light components was changed.

(Formation of B Reflection Cholesteric Liquid Crystal Layer)

During the formation of the B reflection cholesteric liquid crystal layer according to Example 1, the amount of methyl ethyl ketone was changed to 2660 parts by mass, and the coating solution was applied by spin coating. A first B reflecting layer was formed using the same method as that of Example 1, except that, during ultraviolet irradiation, the temperature was changed to 80° C. and the irradiation dose was changed to 300 mJ/cm$^2$. The thickness of the first liquid crystal layer was 0.15 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a B reflection cholesteric liquid crystal layer was obtained, and a B reflecting layer was prepared.

In a case where a cross-section of a coating layer was observed with a scanning electron microscope (SEM), the cholesteric liquid crystalline phase of the B reflecting layer had 8 pitches. In the liquid crystal alignment pattern of the B reflection cholesteric liquid crystal layer, the single period over which the optical axis derived from the liquid crystal compound rotated by 180° was 0.34 µm.

(Formation of G Reflection Cholesteric Liquid Crystal Layer)

Methyl ethyl ketone was applied to the prepared B reflection cholesteric liquid crystal layer by spin coating, and an alignment film was formed on the B reflection cholesteric liquid crystal layer using the same method as described above. Next, the alignment film was exposed using the same preparation method as that of the B reflection cholesteric liquid crystal layer, in a case where the alignment film was exposed using the exposure device shown in FIG. 5, the intersection angle between two light components was changed.

A G reflection cholesteric liquid crystal layer was prepared using the same method as that of the B reflection cholesteric liquid crystal layer, except that the amount of the chiral agent Ch-1 was changed to 5.68 parts by mass during the formation of the B reflection cholesteric liquid crystal layer. The cholesteric liquid crystalline phase of the G reflecting layer had 8 pitches. In the liquid crystal alignment pattern of the G reflection cholesteric liquid crystal layer, the single period over which the optical axis derived from the liquid crystal compound rotated by 180° was 0.41 µm.

(Formation of R Reflection Cholesteric Liquid Crystal Layer)

Methyl ethyl ketone was applied to the prepared G reflection cholesteric liquid crystal layer by spin coating, and an alignment film was formed on the B reflection cholesteric liquid crystal layer using the same method as described above. Next, the alignment film was exposed using the same preparation method as that of the B reflection cholesteric liquid crystal layer, in a case where the alignment film was exposed using the exposure device shown in FIG. 5, the intersection angle between two light components was changed.

An R reflection cholesteric liquid crystal layer was prepared using the same method as that of the B reflection cholesteric liquid crystal layer, except that the amount of the chiral agent Ch-1 was changed to 4.69 parts by mass during the formation of the B reflection cholesteric liquid crystal layer. The cholesteric liquid crystalline phase of the R reflecting layer had 8 pitches. In the liquid crystal alignment pattern of the R reflection cholesteric liquid crystal layer, the single period over which the optical axis derived from the liquid crystal compound rotated by 180° was 0.49 µm.

This way, an optical element was prepared.

Comparative Example 5

A B reflecting layer, a G reflecting layer, and a R reflecting layer were prepared using the same method as that of Example 9, in a case where the alignment film was exposed using the exposure device shown in FIG. 5, the intersection angle between two light components was changed.

The following was verified using the same method as that of Example 9. In the liquid crystal alignment pattern of the B reflection cholesteric liquid crystal layer, the single period over which the optical axis derived from the liquid crystal compound rotated by 180° was 0.41 µm.

In the liquid crystal alignment pattern of the G reflection cholesteric liquid crystal layer, the single period over which the optical axis derived from the liquid crystal compound rotated by 180° was 0.41 µm.

In the liquid crystal alignment pattern of the R reflection cholesteric liquid crystal layer, the single period over which the optical axis derived from the liquid crystal compound rotated by 180° is 0.42 µm.

Using the B reflecting layer, the G reflecting layer, and the R reflecting layer, an optical element was prepared with the same method as that of Example 9.

Example 10

A B reflecting layer, a G reflecting layer, and a R reflecting layer were prepared using the same method as that of Example 9, in a case where the alignment film was exposed using the exposure device shown in FIG. 5, the intersection angle between two light components was changed.

The following was verified using the same method as that of Example 9. In the liquid crystal alignment pattern of the B reflection cholesteric liquid crystal layer, the single period over which the optical axis derived from the liquid crystal compound rotated by 180° was 0.44 µm.

In the liquid crystal alignment pattern of the G reflection cholesteric liquid crystal layer, the single period over which the optical axis derived from the liquid crystal compound rotated by 180° was 0.52 µm.

In the liquid crystal alignment pattern of the R reflection cholesteric liquid crystal layer, the single period over which the optical axis derived from the liquid crystal compound rotated by 180° is 0.63 µm.

Using the B reflecting layer, the G reflecting layer, and the R reflecting layer, an optical element was prepared with the same method as that of Example 9.

Comparative Example 6

A B reflecting layer, a G reflecting layer, and a R reflecting layer were prepared using the same method as that of Example 9, in a case where the alignment film was exposed using the exposure device shown in FIG. 5, the intersection angle between two light components was changed.

The following was verified using the same method as that of Example 9. In the liquid crystal alignment pattern of the B reflection cholesteric liquid crystal layer, the single period over which the optical axis derived from the liquid crystal compound rotated by 180° was 0.52 µm.

In the liquid crystal alignment pattern of the G reflection cholesteric liquid crystal layer, the single period over which the optical axis derived from the liquid crystal compound rotated by 180° was 0.52 µm.

In the liquid crystal alignment pattern of the R reflection cholesteric liquid crystal layer, the single period over which the optical axis derived from the liquid crystal compound rotated by 180° is 0.52 µm.

Using the B reflecting layer, the G reflecting layer, and the R reflecting layer, an optical element was prepared with the same method as that of Example 9.

[Evaluation of Wavelength Dependence of Reflection]

In a case where light was incident into the prepared optical element from the front (direction with an angle of 0° with respect to the normal line), angles (reflection angles) of reflected light of red light, green light, and blue light with respect to the incidence light were measured.

Specifically, each of laser beams having an output center wavelength in a red light range (635 nm), a green light range (530 nm), and a blue light range (450 nm) was caused to be vertically incident into the prepare optical element from a position at a distance of 100 cm in the normal direction, and reflected light was captured using a screen disposed at a distance of 100 cm to calculate a reflection angle.

Based on an average reflection angle $\theta_{ave}$ of the red light, the green light, and the blue light and a maximum reflection angle $\theta_{ave}$ and a minimum reflection angle $\theta_{ave}$ among the reflection angles of the red light, the green light, and the blue light, a wavelength dependence of reflection PE [%] was calculated from the following expression. As PE decreased, the wavelength dependence of reflection was low.

$$PE[\%] = [(\theta_{max} - \theta_{min})/\theta_{ave}] \times 100$$

A case where PE was 10% or lower was evaluated as A.
A case where PE was higher than 10% and 20% or lower was evaluated as B.
A case where PE was higher than 20% and 30% or lower was evaluated as C.
A case where PE was higher than 30% was evaluated as D.

In Examples 4 and Comparative Example 4, laser light was caused to be vertically incident into the prepare optical element from a position at a distance of 5.0 mm from the center of the concentric circle of the liquid crystal alignment pattern, and the wavelength dependence PE [%] was calculated using the same method as described above.

Figure 10:
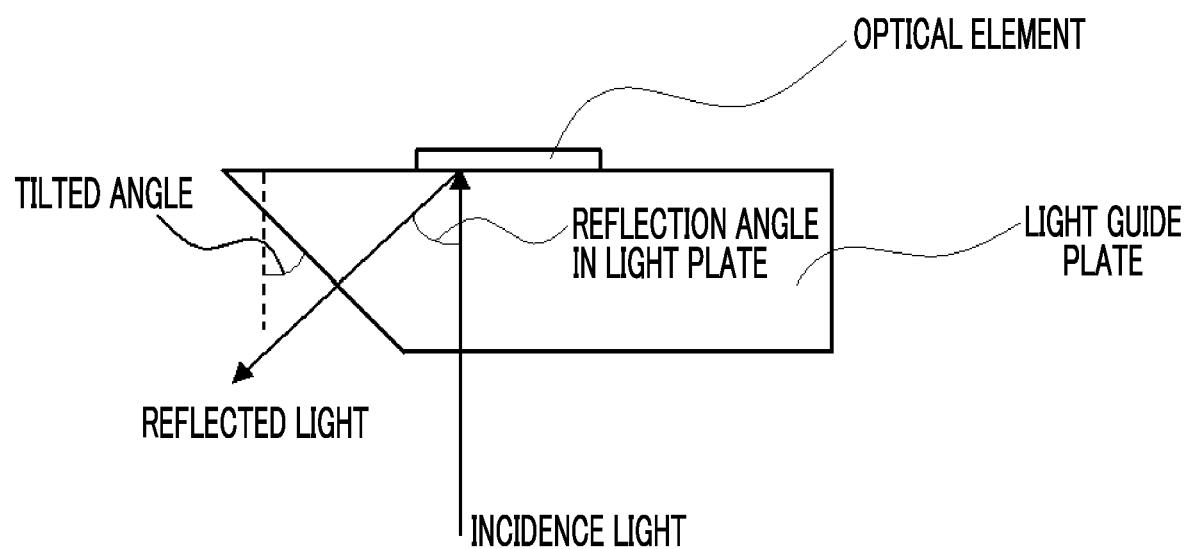
FIG. 10 is a conceptual diagram showing a method of method of measuring a reflection angle in Examples.

In addition, in Examples 9 and 10 and Comparative Examples 5 and 6, light is totally reflected from the main surface of the support. Therefore, the optical element was bonded to the light guide plate in which an edge surface was tilted as shown in FIG. 10, and the evaluation was performed. Based on the measured reflection angle, a reflection angle of reflected light in the light guide plate was calculated using the Snell's law. As the light guide plate, glass having a refractive index of 1.52 was used.

The results are shown in the following table.

TABLE 1

|  |  | Example 1 | Example 2 | Example 3 | Comparative Example 1 | Comparative Example 2 | Comparative Example 3 |
| --- | --- | --- | --- | --- | --- | --- | --- |
| B Reflecting Layer | Composition | A-1 | A-1 | B-1 | A-1 | A-1 | B-1 |
|  | Reflection Center Wavelength | 450 | 450 | 450 | 450 | 450 | 450 |
|  | Single Period [µm] | 2.6 | 0.9 | 0.9 | 3.1 | 1.1 | 1.1 |
| G Reflecting Layer | Composition | A-2 | A-2 | B-2 | A-2 | A-2 | B-2 |
|  | Reflection Center Wavelength | 530 | 530 | 530 | 530 | 530 | 530 |
|  | Single Period [µm] | 3.1 | 1.1 | 1.1 | 3.1 | 1.1 | 1.1 |
| R Reflecting Layer | Composition | A-3 | A-3 | B-3 | A-3 | A-3 | B-3 |
|  | Reflection Center Wavelength | 635 | 635 | 635 | 635 | 635 | 635 |
|  | Single Period [µm] | 3.7 | 1.3 | 1.3 | 3.1 | 1.1 | 1.1 |

TABLE 1-continued

| | | | | | | | |
|---|---|---|---|---|---|---|---|
| Evaluation | Average Reflection Angle [°] | 10 | 30 | 30 | 10 | 30 | 30 |
| | PE | A | A | A | D | D | D |

| | | Example 4 | Comparative Example 4 |
|---|---|---|---|
| B Reflecting Layer | Composition | A-1 | A-1 |
| | Reflection Center Wavelength | 450 | 450 |
| | Single Period [μm] | 4.5 | 5.3 |
| G Reflecting Layer | Composition | A-2 | A-2 |
| | Reflection Center Wavelength | 530 | 530 |
| | Single Period [μm] | 5.3 | 5.3 |
| R Reflecting Layer | Composition | A-3 | A-3 |
| | Reflection Center Wavelength | 635 | 635 |
| | Single Period [μm] | 6.4 | 5.3 |
| Evaluation | Average Reflection Angle [°] | 50 | 50 |
| | PE | A | D |

| | | Example 5 | Example 6 | Example 7 | Example 8 | Example 9 | Comparative Example 5 | Example 10 | Comparative Example 6 |
|---|---|---|---|---|---|---|---|---|---|
| B Reflecting Layer | Composition | A-1 | A-1 | A-1 | A-1 | A-1 | A-1 | A-1 | A-1 |
| | Reflection Center Wavelength | 450 | 450 | 450 | 450 | 450 | 450 | 450 | 450 |
| | Single Period [μm] | 2.7 | 2.8 | 2.9 | 1 | 0.34 | 0.41 | 0.44 | 0.52 |
| G Reflecting Layer | Composition | A-2 | A-2 | A-2 | A-2 | A-2 | A-2 | A-2 | A-2 |
| | Reflection Center Wavelength | 530 | 530 | 530 | 530 | 530 | 530 | 530 | 530 |
| | Single Period [μm] | 3.1 | 3.1 | 3.1 | 1.1 | 0.41 | 0.41 | 0.52 | 0.52 |
| R Reflecting Layer | Composition | A-3 | A-3 | A-3 | A-3 | A-3 | A-3 | A-3 | A-3 |
| | Reflection Center Wavelength | 635 | 635 | 635 | 635 | 635 | 635 | 635 | 635 |
| | Single Period [μm] | 3.5 | 3.3 | 3.2 | 1.2 | 0.49 | 0.42 | 0.63 | 0.52 |
| Evaluation | Average Reflection Angle [°] | 10 | 10 | 10 | 30 | 59 | 63 | 42 | 43 |
| | PE | A | B | C | B | A | C | A | C |

In this table, "Reflection Center Wavelength" represents the selective reflection center wavelength of the cholesteric liquid crystal layer.

As shown in the above-described table, in the optical element according to the embodiment of the present invention in which a permutation of lengths of the selective reflection center wavelengths of the cholesteric liquid crystal layers and a permutation of lengths of the single periods in the liquid crystal alignment patterns of the cholesteric liquid crystal layers match each other, the wavelength dependence of the reflection angle is small, and red light, green light, and blue light can be reflected substantially at the same angles.

In particular, in Examples 6 and 8 in which the single period over which the optical axis derived from the liquid crystal compound rotates by 180° satisfies Expression (1) representing the preferable range of the single period, the wavelength dependence of the reflection angle was smaller. In particular, in Example 5 in which the single period over which the optical axis derived from the liquid crystal compound rotates by 180° satisfies Expression (2) representing the more preferable range of the single period and in Examples 1 to 4 in which the single period satisfies Expression (3) representing the still more preferable range of the single period, the wavelength dependence of the reflection angle was much smaller. Examples 1 to 4 and Example 5 were evaluated as A. However, in Examples 1 to 4 satisfying Expression (3), PE (the wavelength dependence of reflection) was extremely small at 5% or lower, and the wavelength dependence of the reflection angle was particularly small.

In addition, as shown in Examples 9 and 10, in the optical element according to the embodiment of the present invention, even in the case of the liquid crystal alignment pattern in which the single period over which the optical axis derived from the liquid crystal compound rotates by 180° was short at 1 μm or less, the wavelength dependence of the reflection angle can be suitably reduced.

On the other hand, in the optical element according to Comparative Examples in which a permutation of lengths of the selective reflection center wavelengths of the cholesteric liquid crystal layers and a permutation of lengths of the single periods in the liquid crystal alignment patterns of the cholesteric liquid crystal layers do not match each other, the wavelength dependence of the reflection angle is large, and red light, green light, and blue light cannot be reflected substantially in the same direction.

Example 11

An R reflection cholesteric liquid crystal layer having a selective reflection center wavelength of 635 nm and reflecting left circularly polarized light was formed using the same method as that of Example 1, except that the chiral agent was changed to Ch-3 and the addition amount thereof was changed to 11.30 parts by mass. Using the R reflection cholesteric liquid crystal layer, a second R reflecting layer was prepared.

In a case where the second R reflecting layer was added to the optical element according to Example 1, the result of the evaluation of the wavelength dependence of reflection shows the same as that of Example 1, and the reflection of red light was higher than that of Example 1.

In a case where the R reflecting layer reflecting right circularly polarized light and the second R reflecting layer reflecting left circularly polarized light were laminated, the reflecting layers were bonded to each other such that the rotation directions in which the direction of the optical axis in the liquid crystal alignment pattern was continuous were different from each other.

—Chiral Agent Ch-3—

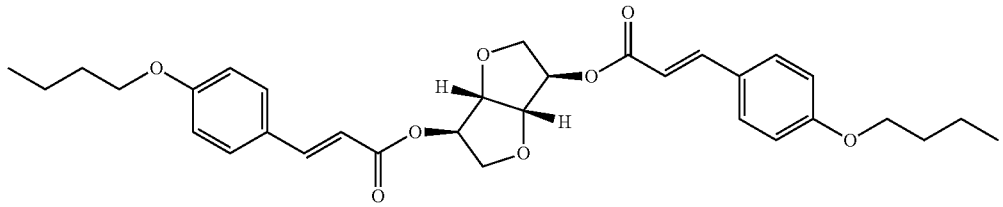 [SMILES: CCCCOc1ccc(/C=C/C(=O)O[C@@H]2CO[C@@H]3[C@H]2OC[C@H]3OC(=O)/C=C/c2ccc(OCCCC)cc2)cc1]

Example 12

A second G reflecting layer and a second B reflecting layer were prepared using the same method as that of Example 9, except that the addition amount of the chiral agent was changed, the second G reflecting layer including a G reflection cholesteric liquid crystal layer that has a selective reflection center wavelength of 530 nm and reflects left circularly polarized light, and the second B reflecting layer including a B reflection cholesteric liquid crystal layer that has a selective reflection center wavelength of 450 nm and reflects left circularly polarized light. Here, the addition amounts of the chiral agent were 9.50 parts by mass (G reflecting layer) and 7.87 parts by mass (B reflecting layer), respectively.

In a case where the same second R reflecting layer as that of Example 9, the second G reflecting layer, and the second B reflecting layer were added to the optical element according to Example 1, the result of the evaluation of the wavelength dependence of reflection shows the same as that of Example 1, and the reflection of red light, green light, and blue light was higher than that of Example 1.

In a case where the reflecting layer reflecting right circularly polarized light and the reflecting layer reflecting left circularly polarized light were bonded to each other such that the rotation directions in which the direction of the optical axis in the liquid crystal alignment pattern was continuous were different from each other.

As can be seen from the above results, the effects of the present invention are obvious.

The present invention is suitably applicable to various uses where light is reflected in an optical device, for example, a diffraction element that causes light to be incident into a light guide plate of AR glasses or emits light to the light guide plate.

EXPLANATION OF REFERENCES

10: optical element
12: R reflecting layer
14: G reflecting layer
16: B reflecting layer
20: support
24B: B alignment film
24G: G alignment film
24R: R alignment film
26B: B reflection cholesteric liquid crystal layer
26G: G reflection cholesteric liquid crystal layer
26R: R reflection cholesteric liquid crystal layer
30: liquid crystal compound
30A: optical axis
34: cholesteric liquid crystal layer
40: display
42: light guide plate
60, 80: exposure device
62, 82: laser
64, 84: light source
68, 86, 94: polarization beam splitter
70A, 70B, 90a, 90B: mirror
72A, 72B, 96: λ/4 plate
92: lens
$B_R$: right circularly polarized light of blue light
$G_R$: right circularly polarized light of green light
$R_R$: right circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q: absolute phase
E: equiphase surface
U: user

What is claimed is:
1. An optical element comprising:
a plurality of cholesteric liquid crystal layers that are laminated, the cholesteric liquid crystal layers being obtained by immobilizing a cholesteric liquid crystalline phase,
wherein the plurality of cholesteric liquid crystal layers have different selective reflection center wavelengths,
the cholesteric liquid crystal layer has a liquid crystal alignment pattern in which a direction of an optical axis derived from a liquid crystal compound changes while continuously rotating in at least one in-plane direction,
in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths, and the optical element comprises cholesteric liquid crystal layers having the same selective reflection center wavelength and different directions of circularly polarized light to be reflected, wherein in the cholesteric liquid crystal layers having the same selective reflection center wavelength and different directions of circularly polarized light to be reflected, rotation directions in which the direction of the optical axis derived from the liquid crystal compound is continuous in the liquid crystal alignment pattern are different from each other.

2. The optical element according to claim 1, wherein the plurality of cholesteric liquid crystal layers having different selective reflection center wavelengths are laminated such that the lengths of the selective reflection center wavelengths sequentially increase in a laminating direction of the cholesteric liquid crystal layers.

3. The optical element according to claim 1, wherein the length of the single period in the liquid crystal alignment pattern is 50 μm or less.

4. The optical element according to claim 1, wherein at least one of the cholesteric liquid crystal layers has in-plane regions having different lengths of the single periods in the liquid crystal alignment pattern.

5. The optical element according to claim 4, wherein the length of the single period in the liquid crystal alignment pattern of the cholesteric liquid crystal layer decreases in the in-plane direction in which the direction of the optical axis derived from the liquid crystal compound changes while continuously rotating.

6. The optical element according to claim 1, wherein the liquid crystal alignment pattern of the cholesteric liquid crystal layer is a concentric circular pattern having a concentric circular shape where the in-plane direction in which the direction of the optical axis derived from the liquid crystal compound changes while continuously rotating moves from an inside toward an outside.

7. The optical element according to claim 1, comprising: three or more cholesteric liquid crystal layers having different selective reflection center wavelengths.

8. The optical element according to claim 7, comprising: at least a cholesteric liquid crystal layer having a selective reflection center wavelength in a red light wavelength range, a cholesteric liquid crystal layer having a selective reflection center wavelength in a green light wavelength range, and a cholesteric liquid crystal layer having a selective reflection center wavelength in a blue light wavelength range.

9. The optical element according to claim 1, comprising: an alignment film that is provided between at least one set of cholesteric liquid crystal layers, wherein at least one surface of at least one alignment film between the cholesteric liquid crystal layers is in contact with the cholesteric liquid crystal layer.

10. The optical element according to claim 9, wherein both surfaces of at least one alignment film between the cholesteric liquid crystal layers are in contact with the cholesteric liquid crystal layers.

11. A light guide element comprising:
the optical element according to claim 1; and
a light guide plate.

12. The light guide element according to claim 11, wherein two optical elements spaced from each other are provided in the light guide plate.

13. The light guide element according to claim 11, wherein three or more optical elements spaced from each other are provided in the light guide plate.

14. The light guide element according to claim 13, comprising:
a first optical element that allows light to be incident into the light guide plate, a third optical element that emits light from the light guide plate, and a second optical element that reflects light reflected from the first optical element to the third optical element, wherein among the cholesteric liquid crystal layers included in the first optical element, the second optical element, and the third optical element, the length of the single period in the liquid crystal alignment pattern of the cholesteric liquid crystal layer having a longest selective reflection center wavelength is the shortest in the second optical element.

15. An image display device comprising:
the light guide element according to claim 11; and
a display element that emits an image to the optical element of the light guide element.

16. The image display device according to claim 15, wherein the display element emits circularly polarized light to the optical element of the light guide element.

17. The optical element according to claim 1, wherein the cholesteric liquid crystal layers having the same selective reflection center wavelength, the different directions of circularly polarized light to be reflected each other and the different rotation directions in which the optical axes derived from the liquid crystal compound is continuous in the liquid crystal alignment pattern to each other have the same length of the single period.

* * * * *